(12) United States Patent
Masanek, Jr. et al.

(10) Patent No.: US 8,919,796 B2
(45) Date of Patent: *Dec. 30, 2014

(54) INTEGRALLY MOLDED POLYMER HITCH STEP

(71) Applicant: MacNeil IP LLC, Bolingbrook, IL (US)

(72) Inventors: Frederick W. Masanek, Jr., Barrington, IL (US); David F. MacNeil, Hinsdale, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/341,932

(22) Filed: Jul. 28, 2014

(65) Prior Publication Data

US 2014/0333055 A1 Nov. 13, 2014

Related U.S. Application Data

(63) Continuation of application No. 14/243,982, filed on Apr. 3, 2014, now Pat. No. 8,851,495, which is a continuation-in-part of application No. 14/070,275, filed on Nov. 1, 2013, now Pat. No. 8,727,364, which is a continuation-in-part of application No. 13/953,121, filed on Jul. 29, 2013.

(51) Int. Cl.
*B60R 3/00* (2006.01)
*B60D 1/58* (2006.01)
*B60D 1/07* (2006.01)
*B60R 3/02* (2006.01)

(52) U.S. Cl.
CPC . *B60D 1/58* (2013.01); *B60R 3/007* (2013.01); *B60D 1/07* (2013.01); *B60R 3/00* (2013.01); *B60R 3/02* (2013.01)

USPC ...... 280/163; 280/164.1; 280/166; 280/491.5

(58) Field of Classification Search
None
See application file for complete search history.

(56) References Cited

U.S. PATENT DOCUMENTS

| | | |
|---|---|---|
| 382,331 A | 5/1888 | Stanwood |
| 493,373 A | 3/1893 | Alexander |
| 566,919 A | 9/1896 | Lewis et al. |
| 654,535 A | 7/1900 | Glover |
| 810,199 A | 1/1906 | Erret |
| 2,649,308 A | 8/1953 | Bice, Jr. |
| 2,991,118 A | 7/1961 | Sieger |
| 3,357,719 A | 12/1967 | McCrea |
| 3,580,613 A | 5/1971 | Northrop |
| 3,608,943 A | 9/1971 | Gostomski |
| 3,627,350 A | 12/1971 | Cross |
| 3,717,362 A | 2/1973 | Johnson |
| 3,751,072 A | 8/1973 | Williams |
| 3,756,622 A | 9/1973 | Pyle et al. |
| 3,762,742 A | 10/1973 | Bucklen |
| 3,774,952 A | 11/1973 | Zorn |
| 3,941,276 A | 3/1976 | Patel |
| 3,967,695 A | 7/1976 | Waddell |
| 3,976,164 A | 8/1976 | Miller |
| 3,980,319 A | 9/1976 | Kirkpatrick |

(Continued)

*Primary Examiner* — J. Allen Shriver, II
*Assistant Examiner* — Hilary L Johns
(74) *Attorney, Agent, or Firm* — Perkins IP Law Group LLC; Jefferson Perkins

(57) ABSTRACT

A trailer hitch step, integrally molded of a polymer compound, is capable of accepting a predetermined off-axis vertical load without an objectionable degree of torsional displacement, while also being capable of resiliently absorbing energy from rear impacts.

14 Claims, 14 Drawing Sheets

(56) References Cited

U.S. PATENT DOCUMENTS

| | | |
|---|---|---|
| 3,992,047 A | 11/1976 | Barenyi et al. |
| 4,017,093 A | 4/1977 | Stecker, Sr. |
| 4,021,071 A | 5/1977 | Norman |
| 4,056,270 A | 11/1977 | Greenfield |
| 4,073,502 A | 2/1978 | Frank et al. |
| 4,092,808 A | 6/1978 | Maloney, Jr. et al. |
| 4,106,790 A | 8/1978 | Weiler |
| 4,110,673 A | 8/1978 | Nagy et al. |
| 4,180,143 A | 12/1979 | Clugston |
| 4,185,849 A | 1/1980 | Jaeger |
| 4,231,583 A | 11/1980 | Learn |
| 4,274,648 A | 6/1981 | Robins |
| 4,312,515 A | 1/1982 | Allori |
| 4,463,962 A | 8/1984 | Snyder |
| 4,536,004 A | 8/1985 | Brynielsson et al. |
| 4,570,962 A | 2/1986 | Chavira |
| 4,620,609 A | 11/1986 | Elsten |
| 4,623,160 A | 11/1986 | Trudell |
| 4,639,032 A | 1/1987 | Barbour |
| 4,679,810 A | 7/1987 | Kimball |
| 4,708,355 A | 11/1987 | Tiede |
| D296,431 S | 6/1988 | Yont |
| 4,753,447 A | 6/1988 | Hall |
| 4,889,374 A | 12/1989 | Choun |
| 4,893,856 A | 1/1990 | Council |
| 4,943,076 A | 7/1990 | Tripke |
| 4,947,961 A | 8/1990 | Dudley |
| D315,134 S | 3/1991 | Springer |
| 5,265,896 A | 11/1993 | Kravitz |
| 5,358,269 A | 10/1994 | Jakeman et al. |
| 5,366,264 A | 11/1994 | Guay |
| 5,398,464 A | 3/1995 | Jacobs |
| 5,478,124 A | 12/1995 | Warrington et al. |
| D370,452 S | 6/1996 | Beasley |
| 5,620,218 A | 4/1997 | Saltzman et al. |
| 5,647,621 A | 7/1997 | McClellan |
| 5,697,630 A | 12/1997 | Thompson et al. |
| 5,702,118 A | 12/1997 | Hanson et al. |
| 5,716,064 A | 2/1998 | Frerichs |
| 5,738,362 A | 4/1998 | Ludwick |
| 5,829,774 A | 11/1998 | Klemp |
| 5,845,435 A | 12/1998 | Knudson |
| 5,979,094 A | 11/1999 | Brafford, Jr. |
| 6,007,033 A | 12/1999 | Casson et al. |
| 6,053,627 A | 4/2000 | Vo et al. |
| 6,140,919 A | 10/2000 | Buchanan |
| 6,145,861 A | 11/2000 | Willis |
| 6,170,843 B1 | 1/2001 | Maxwell et al. |
| 6,173,979 B1 * | 1/2001 | Bernard ................. 280/163 |
| D440,931 S | 4/2001 | Knight, III et al. |
| 6,357,899 B1 | 3/2002 | Craven |
| 6,398,276 B1 | 6/2002 | Smith |
| 6,439,589 B1 | 8/2002 | Payne |
| 6,491,315 B2 | 12/2002 | Hagen et al. |
| 6,511,086 B2 | 1/2003 | Schlicht |
| 6,659,519 B2 | 12/2003 | Turner |
| 6,682,086 B1 | 1/2004 | Erickson |
| D491,509 S | 6/2004 | Bundy |
| 6,769,704 B2 | 8/2004 | Cipolla |
| 6,896,303 B1 | 5/2005 | Mohr |
| D511,319 S | 11/2005 | Wang |
| D513,217 S | 12/2005 | Daws et al. |
| 6,979,015 B1 | 12/2005 | Eberle |
| 6,993,870 B2 | 2/2006 | McDonald et al. |
| D527,323 S | 8/2006 | Storer |
| 7,100,928 B1 | 9/2006 | VanValkenburgh |
| D549,623 S | 8/2007 | Gaddy |
| 7,278,239 B1 | 10/2007 | West |
| 7,377,564 B1 | 5/2008 | Baffy et al. |
| 7,390,003 B1 | 6/2008 | Sylvia |
| D582,826 S | 12/2008 | Burchett et al. |
| D595,630 S | 7/2009 | McPherson et al. |
| 7,661,693 B1 | 2/2010 | Lipski |
| 7,766,357 B2 | 8/2010 | Arvanites |
| 7,775,536 B2 | 8/2010 | Shumway |
| D634,687 S | 3/2011 | Vukel |
| 7,954,836 B2 | 6/2011 | Mann |
| 7,967,311 B2 * | 6/2011 | Phillips ................. 280/166 |
| D645,805 S | 9/2011 | Vukel |
| D652,775 S | 1/2012 | Spera |
| 2003/0011164 A1 | 1/2003 | Cipolla |
| 2003/0116938 A1 | 6/2003 | Shields et al. |
| 2003/0184100 A1 | 10/2003 | Turner |
| 2007/0246449 A1 | 10/2007 | Bachman |
| 2008/0011797 A1 | 1/2008 | Newbill |
| 2008/0018074 A1 | 1/2008 | Steffens et al. |
| 2010/0294819 A1 | 11/2010 | Spera |
| 2011/0285104 A1 | 11/2011 | Wotherspoon |
| 2013/0270791 A1 | 10/2013 | Anderson |

\* cited by examiner

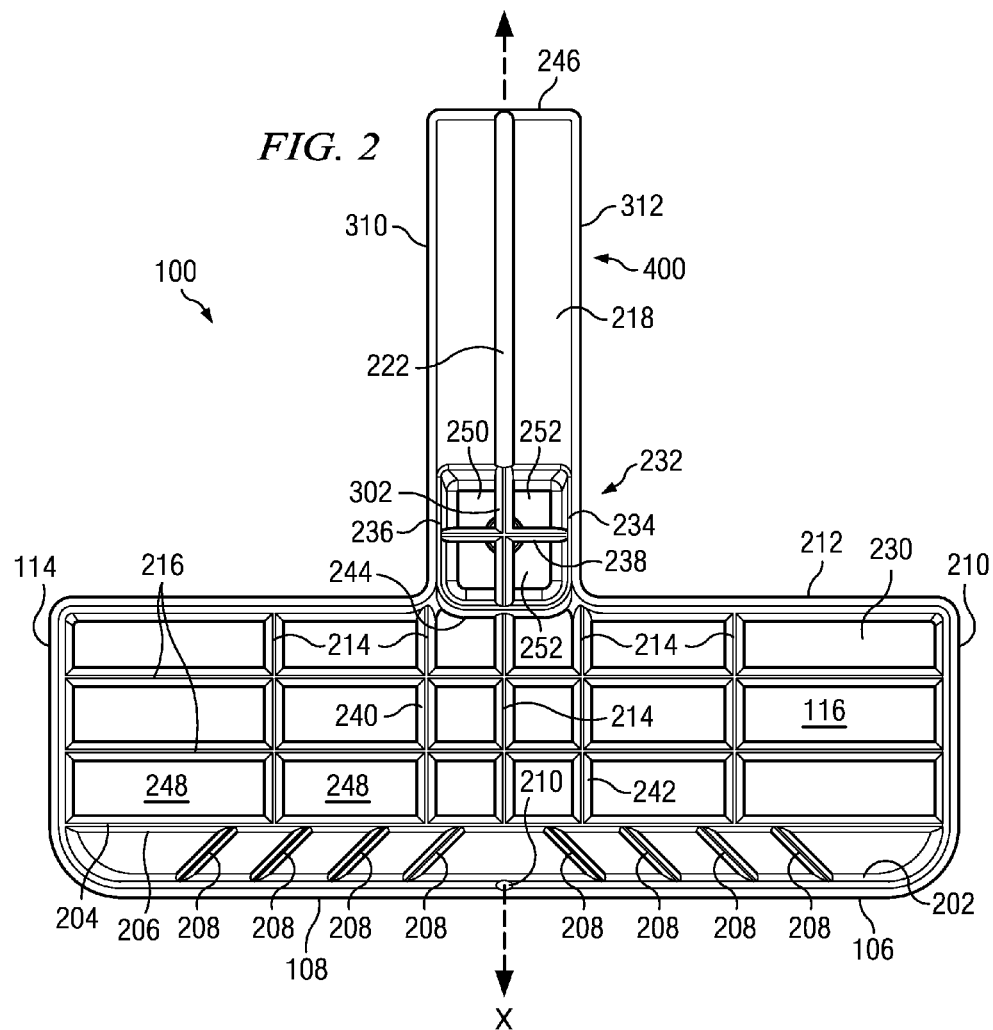
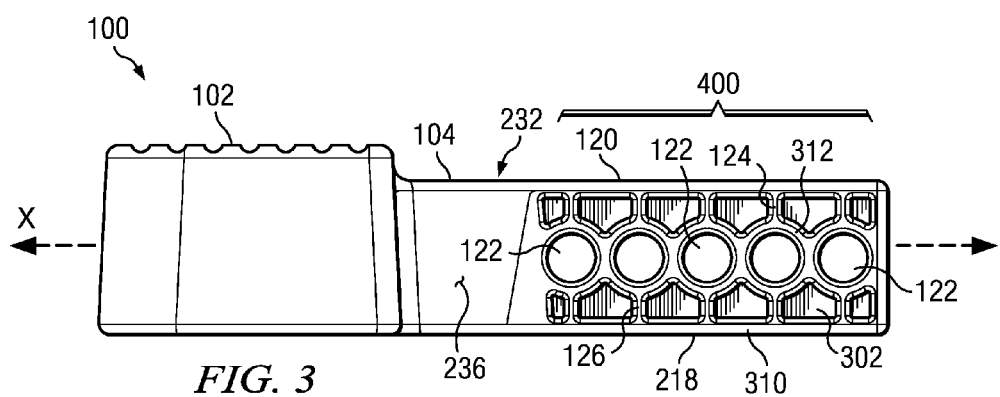

INTEGRALLY MOLDED POLYMER HITCH STEP

RELATED APPLICATIONS

This application is a continuation of co-pending U.S. patent application Ser. No. 14/243,982 filed Apr. 3, 2014, which is in turn a continuation-in-part of U.S. patent application Ser. No. 14/070,275, filed Nov. 1, 2013, now issued as U.S. Pat. No. 8,727,364 B2, which is in turn a continuation-in-part of co-pending U.S. patent application Ser. No. 13/953,121 filed Jul. 29, 2013. All of the foregoing pending patent applications are owned by a common assignee hereof and the disclosure and drawings of all of them are fully incorporated by reference herein.

BACKGROUND OF THE INVENTION

Pickup trucks, sport utility vehicles (SUVs), vans and mini-vans often have trailer hitch receivers that mount to the frame of the vehicle. A common type of trailer hitch receiver has a rearward-facing opening that accepts ball mounts, bike racks, cargo carriers and other hitch mounted accessories. One accessory often attached to the hitch is a platform or step attachment, also known as a hitch step. By providing a raised platform, the platform or step attachment makes the bed of the truck or SUV more accessible to the user. However, because the platform or step attachment extends rearwardly past the bumper, it will be the point of first impact for many rear end collisions.

Thus a need exists for a hitch step that absorbs force from the impact of a rear end collision.

Prior hitch steps have been formed of metal, usually steel. This is because the hitch step, to be commercially acceptable, has to withstand the application of the weight of an adult at an off-axis position without unacceptable torsional or cantilever deformation. Prior hitch steps therefore add considerable weight to the vehicle and their ability to absorb, rather than transmit, impacts from the rear of the vehicle is limited.

SUMMARY OF THE INVENTION

According to one aspect of the invention, a hitch step for insertion into a vehicle hitch receiver is integrally molded from a polymeric material. A substantially hollow step body of the hitch step has at least one vertically and transversely oriented internal support member and presents an upper surface for receiving a vertical load of a foot of a user. At least one external face of the step body, parallel to the hitch receiver axis, is open. The transverse support member has a thickness which is many times less than the depth of the step body and extends for at least a substantial portion of the step body's height.

A substantially hollow tongue of the hitch step is sized to be received into the hitch step receiver and extends axially forwardly from the step body. The width of the tongue is many times less than a width of the step body. The tongue has a throat region adjoining the step body and a forward region extending forwardly from the throat region. The throat region has at least one external face which is parallel to the axis and which is open. Vertically disposed reinforcing plates of the throat region extend from the open face vertically to either a horizontal panel of the throat region or to an opposed external face of the throat region. The forward region of the tongue has at least one external open face parallel to the axis and a vertical plate disposed in parallel to the axis. The thickness, in a transverse direction, of the vertical plate is many times less than the width of the tongue. At least one trailer hitch pin hole is formed to transversely extend through the vertical plate.

According to another aspect of the invention, a hitch step is integrally molded of a polymer compound and has a step body and a tongue. The step body is joined to a rear end of the tongue. The height and width of the tongue are preselected so as to be closely slidably received into a vehicle hitch receiver. The width of the body is many times that of the tongue. The tongue includes a throat region formed adjacent to the body and a forward region extending forwardly from the throat region. At least one hitch pin hole extends transversely through the forward region. The throat region has at least one open external face parallel to the receiver axis. A volume of the throat region extends vertically from the open face, and extends either to an opposed throat region face or to a panel. Reinforcing plates of the throat region extend vertically from the open face and divide all of the throat region volume into substantially triangularly prismatic cells. In use, the step body is solely supported by the tongue. The reinforcing plates of the throat region are so disposed that they will resist torque around the axis caused by the weight of a user imposed on a step body top surface at a transversely off-axis location.

According to another aspect of the invention, the hitch step has a step body and a tongue joined to the step body. The tongue is sized to be slidably received into a vehicle hitch receiver and in use provides the sole support for the step body, which has a width which is many times greater than the width of the tongue. When a load of 250 pounds is placed on the top surface of the step body at a location transversely displaced from the axis by about four inches, and at room temperature, the step body will deflect in a plane perpendicular to the axis by no more than ten degrees, and will resume its initial position after the weight is removed.

BRIEF DESCRIPTION OF THE DRAWINGS

Further aspects of the invention and their advantages can be discerned in the following detailed description, in which like characters denote like parts and in which:

FIG. 2 is a bottom view of the hitch step shown in FIG. 1;

FIG. 3 is a side view of the hitch step shown in FIG. 1;

DETAILED DESCRIPTION

Figure 1:
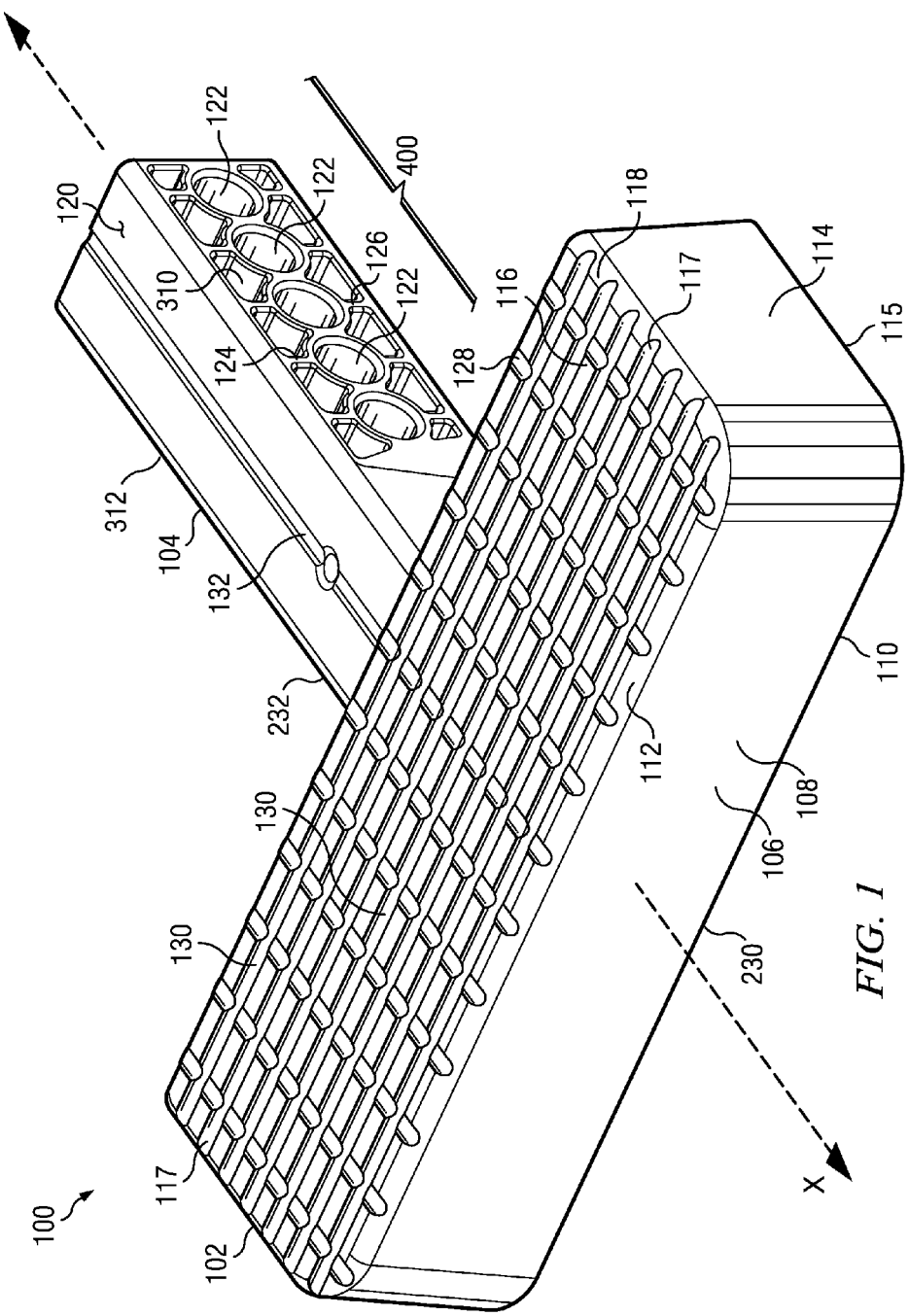
FIG. 1 is an isometric view of one embodiment of an injection-molded hitch step according to the invention.

The present invention provides an injection-molded plastic hitch step for insertion into a receiver type hitch on a vehicle. In the embodiment shown in FIG. 1, a step platform or hitch step, indicated generally at 100, includes a step body 102 and a receiver tongue or post 104. The illustrated embodiment of the receiver tongue 104 has a square cross-section that is so dimensioned that it will closely fit into a popular size of hitch receiver (nominally two inches, but typically slightly larger); in one embodiment, the width and height of the tongue 104 are 2.00 inches, with stripes or "crush areas" which protrude slightly from the general surface and which therefore slightly increase the contact dimensions to achieve a close fit with the receiver. The receiver tongue 104 can be 6.4 inches long from its forward end to its junction with the step body. The tongue 104 can be dimensioned otherwise to fit other hitch receiver types.

The hitch step 100 preferably is formed from a polymeric compound by injection molding, reaction injection molding, or compression molding. The polymeric compound may be thermoplastic or thermosetting. In alternative embodiments, the hitch step 100 could be machined from a hard plastic or a metal such as aluminum. In the embodiments illustrated in FIGS. 1-4, 7-10, 12-14 and 16-18, however, all of hitch step 100 is integrally formed of a thermoplastic or thermosetting polymer compound in a single-shot mold and has no steel, metal or other structural reinforcements. Preferably the step 100 is injection-molded from a thermoplastic compound. It is particularly preferred that the compound used be a stiff thermoplastic elastomer (TPE) of a high flexural modulus, hardness and compression strength. Polyester-polyether block copolymer TPE compounds such as DuPont Hytrel® 7246 have been found to exhibit good elastic memory and resistance to impact, cantilever and torsional forces. Key properties of Hytrel® 7246 appear in the following table:

TABLE I

| Property | Test Method | Value |
| --- | --- | --- |
| Flexural Modulus | ISO 178 | |
| −40 C. | | 2350 MPa |
| 23 C. | | 550 MPa |
| 100 C. | | 200 MPa |
| Hardness, Shore D | ISO 868 | |

TABLE I-continued

| Property | Test Method | Value |
| --- | --- | --- |
| 15 s | | 68 |
| Maximum | | 72 |
| Coefficient of Friction | ASTM D 1894 | 0.23 static, 0.16 dynamic |
| | ASTM D 3702 | 0.90 dynamic |

Alternatively, other thermoplastic polyester elastomer compounds, or more broadly other TPEs, with approximately the same physical properties (particularly flexural modulus) could be used, such as one or more of the TPE's sold under the mark Riteflex® and available from Celanese.

As used herein, a "thermoplastic elastomer" or "TPE" includes any thermoplastic polymer compound which, in its molten state, can be used to create a hitch step by molding, and which, in its cooled, solidified state, exhibits a substantial amount of elasticity. While a TPE is preferred, a thermoplastic polyolefin (TPO) such as a polypropylene or polyethylene, or another thermoplastic polymer such as acrylonitrile butadiene styrene (ABS), could be used instead.

In the embodiment shown in FIG. 1, the step body 102 has a rear panel 106 with an exterior surface 108. The rear panel 106 is nearly perpendicular or at right angles to a longitudinal or fore-and-aft axis X, which in use will align with the axis of the hitch receiver. Rear panel 106 may be planar or may have a slightly convex curve such as a curve with a 400 inch radius. The rear panel 106 has a bottom edge 110 and a top edge 112. The step body 102 may have a right exterior side panel 114 which is substantially parallel with the longitudinal axis X and which joins the rear panel 106.

While rear panel 106 is nearly perpendicular to axis X, preferably it is not completely so, but is slightly forwardly sloped from its bottom edge 110 to the top edge 112. The slope can be chosen from the range of ½ to 3 degrees, and is about 3 degrees in the illustrated embodiment. In this illustrated embodiment, body 102 has an open bottom (as will be explained below), and this slope creates a draft that is advantageous for mold release. Side panel 114 and opposed side panel 210 (see FIG. 2) likewise are slightly sloped toward axis X from their bottom edges 115 to their top edges 117, and in this illustrated embodiment this slope is about 3 degrees. The slope otherwise can be selected from the range of ½ to 3 degrees. The top edges 112, 117 of respective exterior panels 106, 114 may be radiused as shown.

The width or transverse dimension of rear panel 106, and of step body 102 in general, can be about 12 inches, while a depth (in parallel to axis X) of panels 114 and 210, and of step body 102 in general, can be about 4 inches. Panels 106, 114, and 210 can be about 2.5 inches high; in this illustrated embodiment this vertical height is somewhat more than the height of tongue 104 and permits a greater transverse sectional area of the reinforcing plates or members (described below) to better resist an off-axis vertical load. More generally it is preferred that the step body 102 be at least as tall as the tongue 104. The bending moment of the vertical support members internal to step body 102 (described below) is proportional to the cube of their height, and thus a tall step body is far stronger and more resistant to torsion than a thin one, for any given material; specifying a step body 102 to be at least as tall as tongue 104 permits the use of a moldable polymer in place of steel.

The top of the step body 102 may have a top exterior panel 116 which may be joined to the rear panel 106 and the side panels 114, 210. The top panel 116 is substantially horizontal and may have an exterior or upper surface 118. The vertical location of top panel 116 may be offset from the vertical location of top panel 120 of tongue 104 to provide further stiffness of the hitch step body 102 around axis X. Disposing top panel 120 above tongue 104, instead of disposing a bottom of body 102 below tongue 104, also interposes more of the step body 102 between the vehicle bumper (usually positioned above the hitch receiver) and any object that it would otherwise impact.

A series of elongate longitudinal indentations or treads 128 and elongate transverse indentations or treads 130 may be formed on the exterior surface 118, and may take a concave form as shown. In the illustrated embodiment, the longitudinal treads 128 are formed to be in parallel with each other and are regularly spaced apart. Similarly, transverse treads 130 are formed to be in parallel with each other and are regularly spaced apart. The longitudinal and transverse indentations 128, 130 provide traction to the user when using the step; however, the number and placement of the indentations can vary from the illustrated embodiment. The illustrated indentations or treads 128, 130 are straight in the direction of their elongation, and add a modicum of stiffness in longitudinal (fore and aft) and transverse (side to side) directions. They are also useful in hiding mold or sink marks caused by the molding of vertical support members positioned immediately beneath some of them, as will be described below. Further, the local thickness of the part increases at the junctions of those vertical support members and the top panel 120. Making a scallop cut in the top surface of panel 120 locally decreases this thickness and thus tends to mitigate problems otherwise caused by the thickening of the walls, including slower cooling, higher crystallinity and differential shrinkage.

The step body 102 is attached to a forwardly extending receiver post, tang or tongue 104 which will be discussed in further detail below, and in the illustrated embodiment step body 102 and tongue 104 are integrally injection-molded as a single unit. In this illustrated embodiment, top panel 120 is formed of a TPE, such as Hytrel® 7246, and may have a coefficient of friction that is significantly greater than a metal, or even of other plastics such as ABS, polyethylene or polypropylene. According to testing done according to ASTM D3702, Hytrel® 7246 exhibits a dynamic coefficient of friction of 0.90. This is far "stickier" than the dynamic coefficients of friction obtained by this test method of alternative polymers: high density polyethylene (HDPE), 0.28; ultrahigh molecular weight polyethylene (UHMW-PE), 0.12; polypropylene monomer, 0.26; ABS, 0.35. Thus, the selection of a TPE as the polymer compound confers the additional advantage of providing a more slip-resistant top surface 118, without the necessity of adding a softer or more rubbery top layer.

As seen in the embodiment illustrated in FIG. 2, the step body 102 is substantially hollow. The rear panel 106 has an interior side 202 and may join a left exterior side panel 210 of step body 102. The left exterior side panel 210 is substantially parallel to axis X and is transversely spaced from the right exterior side panel 114. The left exterior side panel 210 may extend vertically to join the top panel 116. In the illustrated embodiment left exterior side panel 210 is a mirror image of right exterior side panel 114, and preferably is slightly inwardly sloped from its bottom edge 115 to its top edge 117, as by a slope selected from the range of ½ to 3 degrees.

Many of the embodiments of the present invention will have at least one internal, vertically disposed support member within step body 102. This support member, plate or wall has a thickness which is many times smaller, and usually an order of magnitude smaller, than any overall dimension of step body 102. Particularly as using injection molding to fabricate step 100, the external walls and reinforcing members of the step 100 should be made as thin as possible, to save material and decrease cycle times. The step 100 preferably is built to a nominal wall thickness that is used throughout for the external walls; internal reinforcing members can be either 50%-75% as thick as this nominal wall thickness or, in selected areas, 100% of it. With the preferred polymer compound, a nominal wall thickness of 0.20" can be used; the nominal wall thickness can be chosen otherwise, such as 0.25", as an inverse function of the strength of the material. More uniformity in wall thickness promotes more uniform cooling and tends to mitigate problems associated with crystallization and nonuniform shrinkage.

In the embodiment illustrated in FIGS. 2-6, at least one transverse internal reinforcing or support member 204 is disposed forwardly of the rear exterior panel 106. The support member 204 may take the form of a vertically extending wall, plate or panel and has a rear surface 206. Member 204 may extend between and be joined to the right side panel 114, the left side panel 210, and the top panel 116. In the illustrated embodiment, vertical support member 204 is straight, extends for the entire transverse dimension of step body 102, and is orthogonal to axis X, and this disposition optimizes support member 204 to sustain off-axis vertical loading of step body 102.

Some embodiments may include additional transverse support members or plates 216 such as the two additional transverse members 216 shown in FIG. 2. In this illustrated embodiment, the additional transverse members 216 are disposed substantially at right angles to axis X and are forwardly spaced from the first transverse member 204 and spaced from each other, preferably by at least their thickness. The additional transverse members 216 may be straight and may extend between the right exterior side panel 114 and the left exterior side panel 210.

This illustrated embodiment further has longitudinally aligned, internal support members 214 which may be walls, panels or plates, and may extend from the transverse member 204 to the forward external body panel 212. The longitudinally aligned support members 214 are spaced from each other and are at substantially right angles to the transverse members 204, 216; however the number of additional transverse members 216 and spacing of the additional transverse members 216 may vary from what is shown in the illustrated embodiment of FIG. 2. Longitudinal support members 214 extend vertically to the bottom surface of top panel 116 and resist any torsion along axis X from throat region 232 when a vertical load is imposed on step body 102.

In this illustrated embodiment, more than one oblique cross member 208 extends from the interior side 202 of the exterior rear panel 106 to the rear surface 206 of the transverse member 204. In this illustrated embodiment eight oblique cross members 208 are shown, but other embodiments may have more or fewer than these. Each of the oblique cross members 208 is disposed at an angle between zero and ninety degrees exclusive from axis X; in the illustrated embodiment the angle is approximately forty-five degrees. Additionally, in the illustrated embodiment half of the oblique cross members 208 are on either transverse side of axis X, with their angular dispositions selected such that members 208 are bilaterally symmetrical about axis X. The oblique cross members 208 are adapted to collapse in a forward direction, such that their angle to axis X increases, upon impact being applied to the exterior surface 108 of the rear panel 106. Therefore, in the event of a rear end collision, the collapsing oblique cross members 208 will absorb at least some of the force of the impact. Cross members 208 may have a thickness which is several times less than their length and may take the form of panels or plates, as shown. The members 208 can have a thickness which is 50-75% of the nominal wall thickness adopted for the step 100.

Exterior panels 106, 114, 116, 210 and 212, as well as the exterior panels of the tongue 104, have a nominal wall thickness which is selected as a function of the off-axis vertical load which hitch step 100 is meant to sustain, the spacing apart and presence of any internal vertical support members, the overall dimensions of hitch step 100, and the composition of the polymer compound used to mold the hitch step 100. In the embodiments illustrated in FIGS. 1-4 and 16-18, the nominal wall thickness has been selected to be about 0.2 inches. This wall thickness varies with draft or tapering. In some embodiments, the thickness of the internal vertical support members 204, 214, 216, 208, and of the internal support members (described below) of tongue 104, can be selected to be about 50-75% of the preselected nominal wall thickness. In other embodiments the thickness of the internal vertical support member(s), or selected ones of them, can approach the preselected nominal wall thickness, or even locally exceed the nominal wall thickness at ends remote from the associated open face (described below) in order for the vertical support members to maintain a desired draft.

In order to practically form hitch step 100 as an injection molded or a reaction injection molded part, the structure has to have at least one open face to permit the molding of thin walls. In the embodiments illustrated in FIGS. 1-4 and 16-18, there are three such open faces: an open bottom 230, 250 which includes the entire bottom of the step body 102 as well as the bottom of a tongue throat region 232, an open right side 310 of a forward region 400 of the tongue 104 which extends forwardly from throat region 232 and as seen in FIG. 3, and an open left side 312 of tongue forward region 400 which is the mirror image of open right side 310. As shown in FIG. 3, the forward region 400 of the tongue 104 is substantially hollow. Other embodiments may have more or different open faces, some of which will be described below.

Each open face is an exterior boundary of the hitch step 100 and is a face of a mostly hollow cavity or volume. The volume extends from the open face, preferably at 90 degrees thereto, upward, downward or inward until it is terminated by an intervening panel, or until the opposite exterior side of the hitch step is reached. The intervening panel can be disposed somewhere in the middle of the part, in which case an opposed molding gate will be necessary, or the intervening bounding panel can be the same as an exterior panel of the hitch step on the other side. Where there is no intervening bounding panel, the volume will reach an opposed open face, as is seen for example in the embodiments shown in FIGS. 8 and 9. In many embodiments, the volumes of regions 102, 232 and/or 400 are divided into cells by internal reinforcing or supporting members.

For the illustrated step body 102 of hitch step 100, the open face 230 is a face of a volume which extends upwardly until the lower surface of top external panel 116 is reached. In the embodiments illustrated in FIGS. 1-4 and 16-18, this volume is segmented into a plurality of open cells 248, each of which is approximately prismatic: a top of each cell 248, as formed by top panel 116, has a shape and area similar to the bottom of the cell in the plane of the open bottom 230.

While the cells 248 are approximately and substantially prismatic, they are not completely so. The surfaces of the internal walls 204, 206, 214 preferably will have a draft, such as ½ degree, and as such the cross-sectional area of these cells 248 bounded by walls 204, 206, 214 become smaller as one proceeds upward. The interior surfaces of exterior panels 106, 114, 210, 212 are formed to be in parallel with their respective exterior surfaces, and in this illustrated embodiment therefore are disposed at a draft of 3 degrees.

The tongue 104 has a throat region 232 with a bottom open face 250, as seen in FIG. 2. In at least some mounting configurations the throat region will at least partially protrude from the vehicle hitch receiver (not shown; see FIGS. 9 and 10) in a rear direction. Therefore, the throat region 232 is most susceptible to cantilever bending from an on-axis load, and to torsion caused by a vertical load imposed on top panel 116 at a location transversely displaced from axis X; the hitch step 100 is more susceptible to bending and twisting here than elsewhere, all other things being equal. To resist this torsion, a left wall 234 and a right wall 236 of the throat region 232 can be made to be entire and to have a thickness which is the same as the chosen nominal wall thickness for the hitch step 100. Throat region 232 further may have a central vertical support plate or member 302 on axis X, which is colinear with one of the longitudinal support members 214 in step body 102, and which extends forwardly through forward region 400 of tongue 104 (see FIG. 4). In the embodiment illustrated in FIGS. 2 and 4, the throat region 232 further has one transversely oriented reinforcing member or plate 238 which intersects longitudinal central support member 302 and which extends between right exterior side wall 236 and left exterior side wall 234. The thickness of walls 302 and 238 can be one-half of the nominal wall thickness of hitch step 100, or can be increased to about 100% of the nominal wall thickness. To provide further resistance to torque around axis X, further transverse reinforcing members can be added in throat region 232, as will be described in conjunction with FIGS. 14 and 16 below.

Among the longitudinally oriented support members 214 of the step body 102 are a member 240, seen in FIG. 2 to be disposed a little to the right of tongue sidewall 236 (FIG. 2 being a bottom view), and a member 242, disposed a little to the left of tongue sidewall 234. Further, a rear, transverse support member 244 of throat region 232 has ends which curve forwardly before their respective junctions with front panel 212 and throat region side wall 236 or 234. These junctions are intentionally offset or jogged from each other to more uniformly solidify hitch step 100 during cooling and prevent a void from forming at what would otherwise be a thickened location formed from the junction of multiple walls.

At its union with the front panel 212 of the step body 102, the entire cross-sectional area (height by width) of tongue 104 is contained within the area of the front surface of front panel 212. In this fashion, all of the external walls and the internal reinforcing plates of the throat region 232 are available to resist any torsion caused by off-axis or cantilever loading of step body 102.

In the embodiment illustrated in FIGS. 1-4, the throat region 232 has an open bottom or face 250 and is segmented into four somewhat prismatic cells 252. In this embodiment, the same mold core used to define the internal structure of step body 102 is also used to define the internal structure of throat region 232. The volume bounded by open face 250 ends at a lower surface of tongue top panel 120. The internal surfaces of the walls forming the cells 252 have a draft which can be chosen to be ½ degree.

As shown in FIGS. 1-4, the receiver tongue 104 is disposed around axis X, and in this illustrated embodiment has a top panel 120 and a bottom panel 218 (See FIG. 2) opposed to and spaced from the top panel 120. The top panel 120 and the bottom panel 218 are substantially parallel with the axis X. A top surface of the top panel may have a concave groove or indentation 132 in parallel to axis X and extending for the length of tongue 104, while a longitudinally extending concave groove or indentation 222 in the bottom surface of tongue bottom panel 218 may extend from the throat region 232 to a forward end 246 of the tongue 104 (FIG. 2). A central, longitudinally extending reinforcing wall, panel or plate 302 (See FIGS. 3 and 4) may be vertical. Respective upper and lower ends of the wall 302 may be aligned with the top indentation 132 and/or bottom indentation 222, to hide any mold marks.

In this embodiment, a plurality of cylinders 122 are disposed in the receiver post body 104 at an angle to the axis X, such as 90 degrees. A user-selected one of the cylinders 122 will receive a hitch pin of the hitch receiver, thereby attaching the hitch step 100 to the hitch. Accordingly, the number and placement of cylinders 122 may vary due to the type of receiver-type hitch being used and the application. Each of the cylinders 122 extends through the center panel or plate 302 (see FIGS. 3 and 4) between the open right and left sides 310, 312 of the forward region 400 of the tongue 104. Each cylinder 122 is formed by a wall 314 whose thickness may be chosen to be the same as the nominal wall thickness of hitch step 100. In the embodiment illustrated in FIGS. 1-4, the cylinder walls 314 intersect and overlap each other at a horizontal plane including axis X, so that a longitudinal distance between the internal surface of any cylinder and that of an adjacent cylinder is about the same as the thickness of walls 314.

Each cylinder 122 may have a support structure which includes a top vertical member 124 in parallel with a center of the cylinder 122 and extending from the cylinder 122 to the top panel 120, and a bottom vertical member 126 in parallel with the center of the cylinder 122 and extending from the cylinder 122 to the bottom vertical member 218. Vertical members 124, 126 may have thicknesses which are many times smaller than their lengths and may be plates or panels, as shown, and may have thicknesses specified as the nominal wall thickness or a fraction thereof. Support panels 124, 126 are oriented transversely from axis X. The support structures 124, 126 support cylinders 122 but provide limited resistance to a rear axially applied impact force; in this illustrated embodiment, all of the impact force (to the extent not already absorbed by step body 102) has to be absorbed by cylinders 122, top panel 120, bottom panel 218 and central panel 302.

Cylinders 122 are disposed in a forward region 400 of the tongue 104 which extends forwardly from throat region 232 to forward end 246. In this embodiment, region 400 has two opposed open exterior faces 310, 312 (FIG. 2) that are vertically disposed. Two side actions of the mold are used to mold region 400, and these meet to define a portion of the longitudinal reinforcing member 302. Forward region thus has two opposed open faces respectively defining two forward region volumes, each of which are terminated by central wall or panel 302. The wall surfaces extending inwardly from open faces 310, 312 can have drafts chosen as ½ degree.

Figure 4:
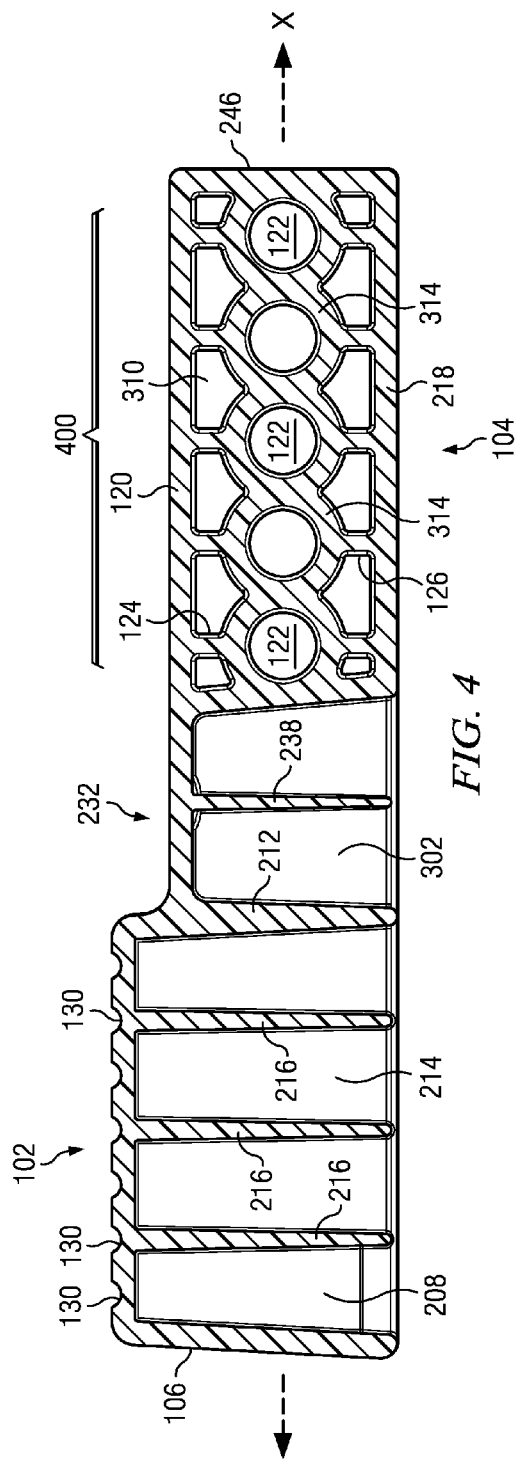
FIG. 4 is a side sectional view of the hitch step shown in FIG. 1.

As seen in the sectional view of FIG. 4, not all of the support members in step body 102 have to extend for the entire height of the step body 102. In this embodiment the oblique members 208 are not as tall as the step body's external panels or other supporting members. In alternative embodiments, the height of the internal vertical support members can decrease as a function of their distance from axis X (see FIG. 12).

Figure 5:
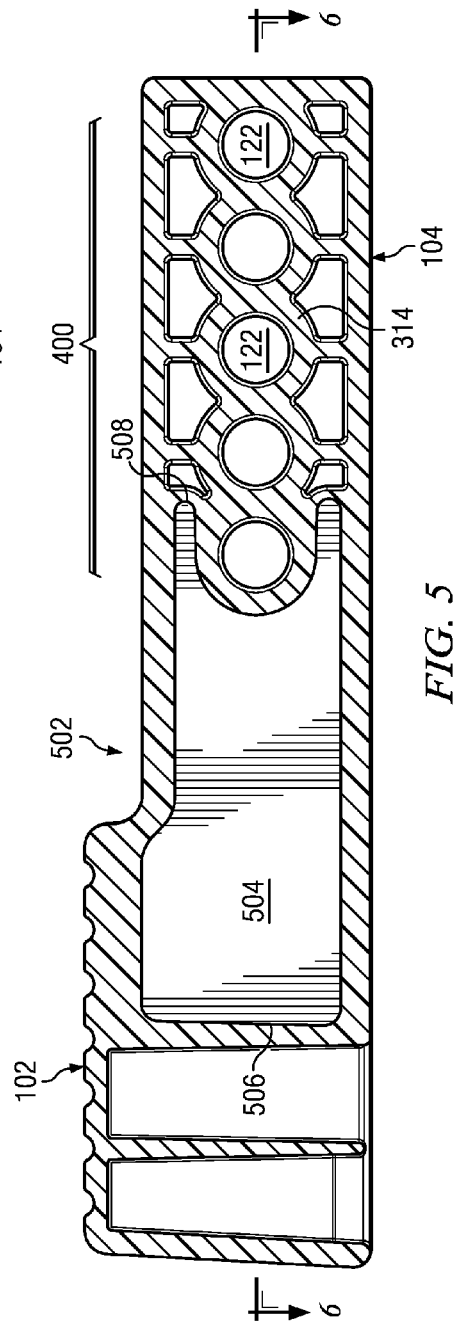
FIG. 5 is a side sectional view similar to that shown in FIG. 4, but of a second embodiment including a metal reinforcing member.
Figure 6:
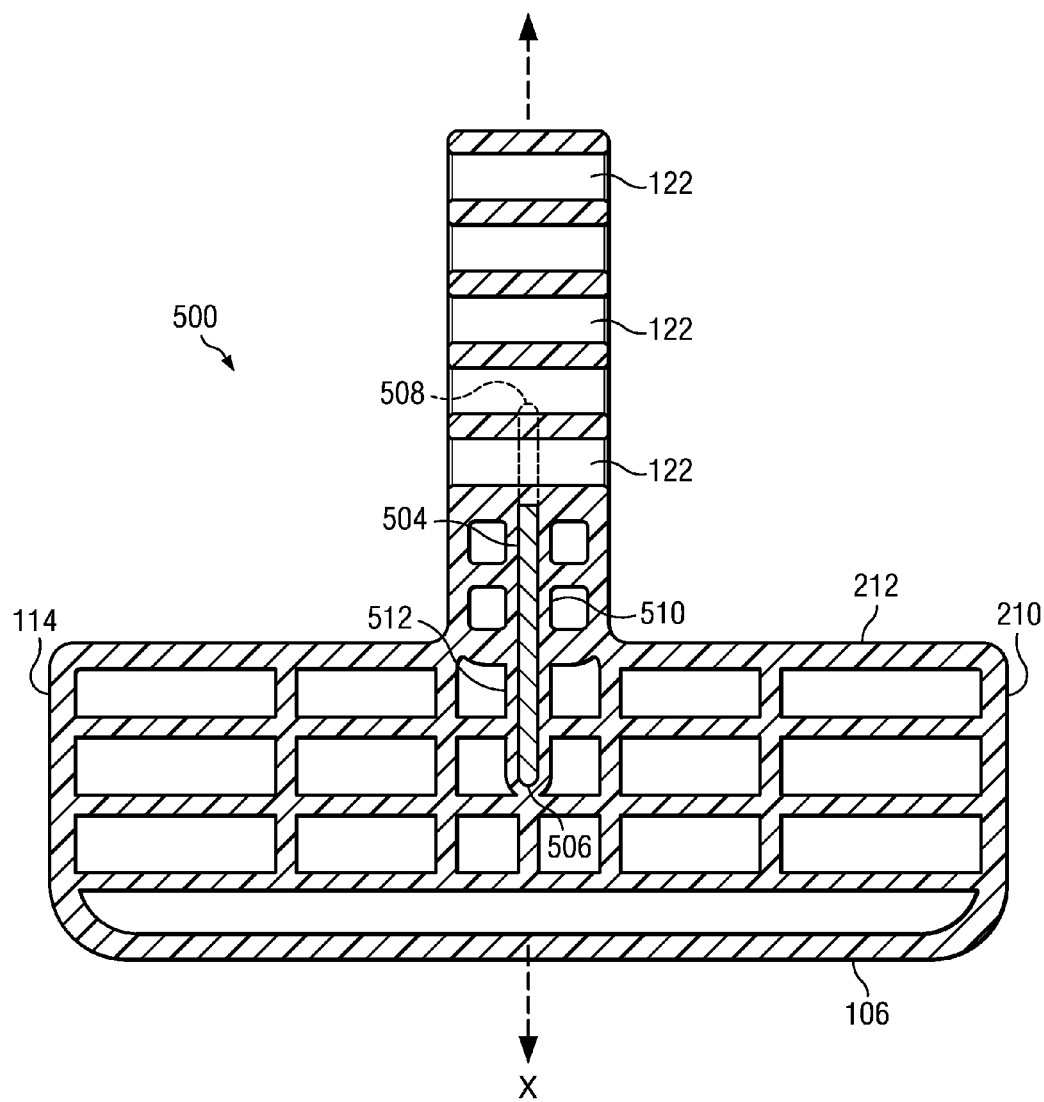
FIG. 6 is a bottom sectional view taken substantially along line 6-6 of FIG. 5.

In the embodiment shown in FIGS. 5 and 6, a hitch step indicated generally at 500 has a step body 102 which is integrally injection molded with a tongue member 104, as before. However, to increase the resistance to torsion in throat region 502, a reinforcing member 504 has been added. Reinforcing member can be made of a metal such as steel, and it is preferred that reinforcing member 504 be made of a metal, such as high-carbon steel, that tends more to elasticity than malleability. Reinforcement 504 is vertically disposed along axis X and extends from a rear end 506 that is within step body 102, to a forward end 508 that is well forward of the throat region 502. The forward end 508 can be slotted, as shown, so that any force tending to forwardly displace the reinforcement or insert 504 within the hitch step 100 will not result in the occlusion of the rearwardmost cylinder 122. A central longitudinal reinforcing member is in this embodiment divided into right and left walls 510, 512, which, in the instance that member 504 is made of steel, will protect member 504 from corrosion. While reinforcement 504 has been added, the hitch step 500 is otherwise completely injection-molded of a thermoplastic polymer compound.

A hitch step according to the invention may otherwise use two pieces, assembled together. For example, a tongue could be formed of steel or aluminum and the step body from an impact plastic; the step body would be bolted onto the tongue. Alternatively, the tongue and the step body are different grades of injection molded plastic, in which a compound for the tongue is chosen for strength, while another compound is chosen for impact resistance. These separate components could be assembled in a number of ways, such as bolts, screws, adhesives or mating snap-features.

Figure 7:
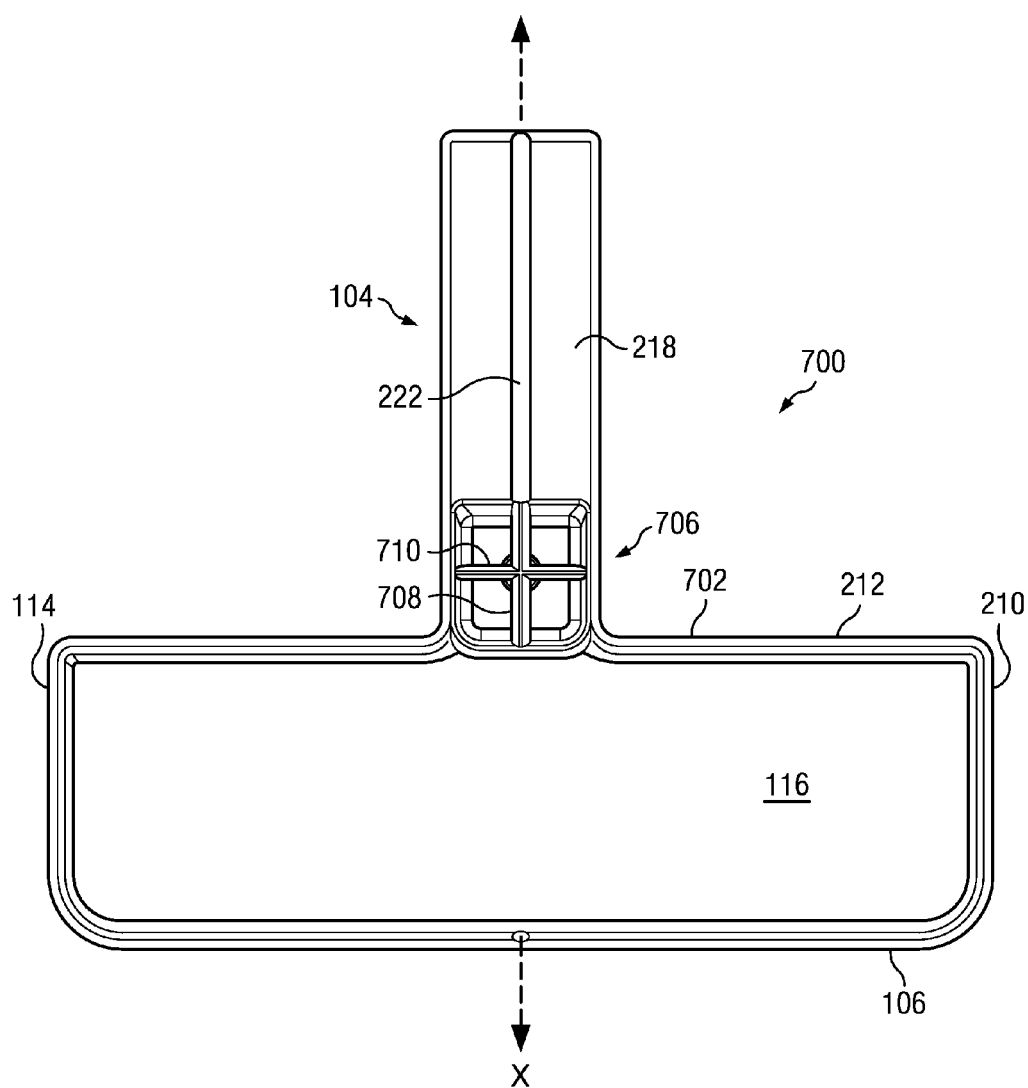
FIG. 7 is a bottom view of a hitch step according to a third embodiment of the invention, in which all internal reinforcing members of the hitch step body have been removed.

FIG. 7 is a bottom view illustrating a hitch step 700 in which all internal support members have been omitted from step body 702. Tongue 104 can be formed as described for FIGS. 1-4 or FIGS. 5-6. The step body 702 continues to have a rearward exterior panel 106, a front exterior panel 212, a right exterior panel 114, a left exterior panel 210 and a top panel 116. The thicknesses of panels 106, 212, 114 and 210 may be increased, as they are the only support members and will provide the sole resistance to a vertical load on the top panel 116 of the hitch step 700. Depending on the thicknesses and polymer compound selected, the resistance to torsional force may still be the most critical at the throat region 706; while longitudinal and transverse internal support members 708, 710 may be needed in the throat region 706, such internal support members at more of a distance from axis X can either be reduced or, as here, entirely omitted. Nonetheless, hitch step 700 is moldable, as by injection molding, reaction injection molding or compression molding, from a thermoplastic or thermosetting polymer compound, as it continues to have at least one open face for all regions of the step 700, and continues to be formed as a substantially hollow structure with relatively thin walls.

Figure 8:
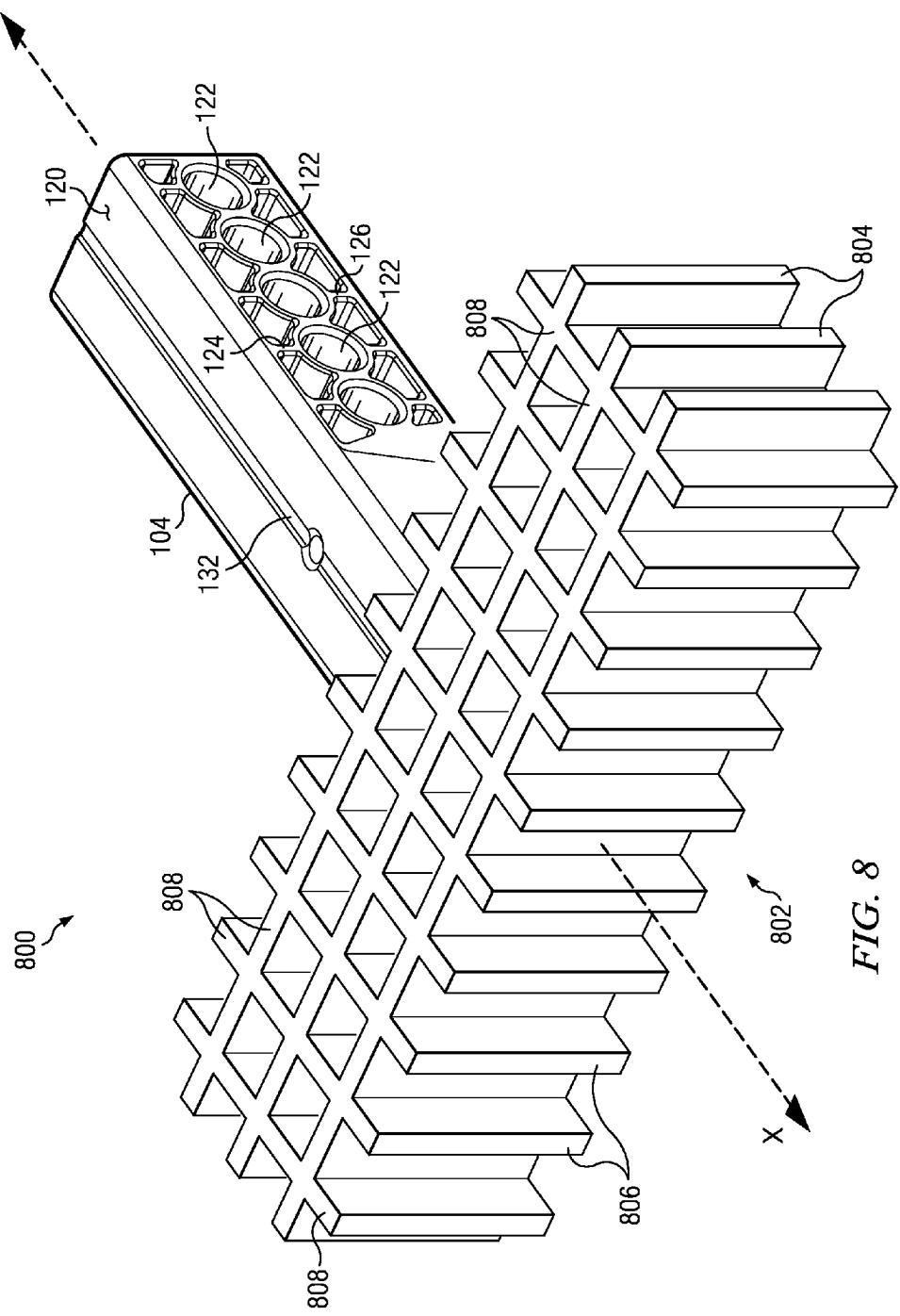
FIG. 8 is an isometric view of a fourth embodiment of the invention, in which the hitch step body is formed by a lattice of internal rectilinear support members but with no external closed faces of the support body.

FIG. 8 illustrates an embodiment that is the logical reverse of the embodiment shown in FIG. 7. A hitch step 800 has a tongue member 104 that is constructed much as the other tongue members described in FIG. 1-4 or 5-6. However, the hitch step body 802, which continues to be integrally molded with tongue 104 from a thermoplastic polymer compound, has no external panels at all, but only internal reinforcing members. These include a plurality of transversely extending, parallel, spaced-apart, vertical walls or support members 804, with which intersect a plurality of longitudinally extending, parallel, spaced-apart, vertical walls or support members 806. A vertical load surface (for the foot of a user) is formed by upper surfaces 808 of the members 804, 806. Hitch step 800 has multiple open faces and relatively thin walls which make it conducive to fabrication by injection molding. The intersections of support members 804 and 806 form a matrix of substantially prismatic cells, and together present a step or top surface to the user. At the same, time, support members 804 and 806 form a volume which can compress during a rear impact, thereby absorbing energy that otherwise would be transmitted to the rest of the vehicle. Other embodiments can be molded which are structurally intermediate the embodiments shown in FIGS. 7 and 8; a designer can decide to omit one or more exterior panels or sections of same, or add or subtract various internal reinforcing members from the step body as desired resistance to torsion around axis X dictates.

In the embodiments illustrated in FIGS. 1-8, the hitch step body has been formed by exterior and/or interior panels or walls which are substantially planar. But this does not have to be the case. The hitch step body should have at least one external or internal vertically disposed support member to resist a vertical load as would be imposed by a foot of a user, should somehow define an upper surface upon which the user can step, should be formed by walls to a nominal wall thickness standard, and should have at least one open face through which a mold core can operate. But the vertical support walls can take various curved or even irregular shapes and still meet all of these criteria.

Figure 9:
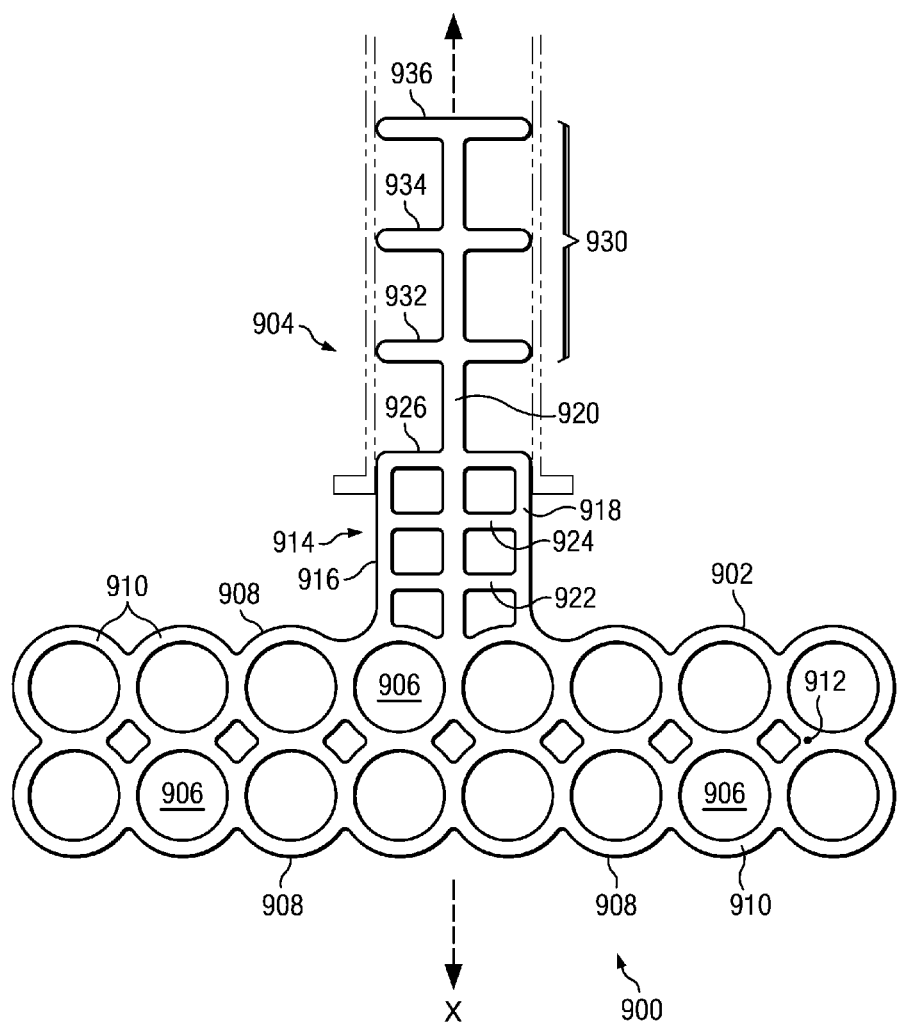
FIG. 9 is an isometric view of a fifth embodiment of the invention, in which the hitch step body is formed by a series of vertically extending cylindrical tubes without either a top or a bottom closed face.

Once such exemplary embodiment is shown in FIG. 9. A hitch step indicated generally at 900 is molded from a polymer compound, and has a step body 902 which is integrally molded with a tongue or tang 904. But the step body 902 is formed by a series of intersecting, vertically disposed cylinders 906 formed by cylinder walls 908. The cylinder walls 908 have a substantially uniform thickness that can be chosen to be the same as the nominal wall thickness preselected for the hitch step 900; they can also have surfaces with small of amounts of draft from the molding surface and inwardly, such that the thickness of the cylinder walls 908 decreases from top to bottom, or vice versa. Upper ends 910 of the cylinder walls 908 are selected to occupy the same horizontal plane, thereby presenting a surface upon which a user can step. Each portion of a cylinder wall 908, other than a portion which is precisely parallel to axis X, will offer some resistance to torsion around axis X as might be caused by weight imposed at exemplary off-axis location 912. The hitch step body 902 is divided into a series of tubular cells, and its volume is bounded by both top and bottom open faces.

In this embodiment, a throat region 914 of the tongue 904 is formed by a left side wall 916, a right side wall 918, and a central longitudinal member 920 which extends for the entire length of the tongue 904. Walls 916, 918 and 920 are intersected by transverse members 922, 924 and 926. All of walls 916-926 are oriented to be vertical. Both the top and the bottom of the throat region are open and this embodiment does not employ any intervening panel which would bound a volume extending inwardly from either open face.

A forward region 930 of the tongue 904 is formed as an open lattice without exterior side, top or bottom walls. Unlike a trailer tang or tongue that normally is received in a trailer hitch receiver, the tongue 904 will experience little tensile force along axis X, and therefore the structure of tongue 904 can be less substantial. A plurality of transverse members 932, 934, 936 extend vertically and horizontally from axis X to form squares which slidably fit within the receiver for which the hitch step 900 is intended; they can be 1.9 inches in height and width, for example. One or a series of hitch pin holes (not shown) are formed through central plate 920 to intersect axis X, so that a trailer hitch pin may be received in one of them.

As so constituted, hitch step 900 can be injection-molded from a thermoplastic polymer compound. All of its walls can be fabricated to a nominal wall thickness or a predetermined fraction thereof, and are relatively thin as compared with the overall dimensions of the hitch step 900, and multiple open external faces present themselves for insertion of mold cores. The transverse members 932, 934, 936 divide the forward region into several cells. Right and left volumes of the forward region extend inwardly from the open faces until they terminate at central longitudinal member 920.

Figure 10:
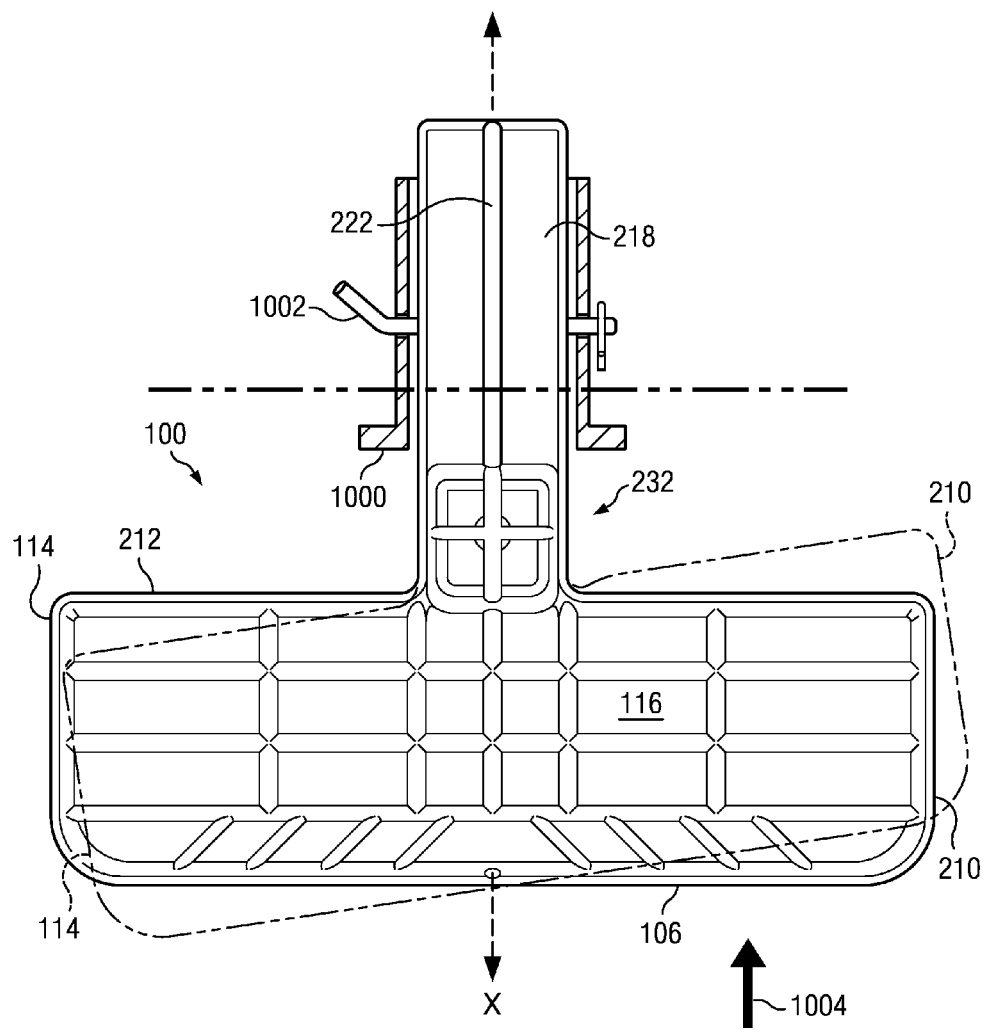
FIG. 10 is a bottom view of a sixth embodiment of the invention, in which the step body and tongue have been integrally injection-molded of a thermoplastic elastomer, showing elastic displacement of the step body from an off-axis rear impact.

FIG. 10 is an illustration of how one embodiment of the hitch step deflects when subjected to an off-axis rear impact. In this example, a hitch step 100 substantially as described in FIGS. 1-4 is injection-molded of Hytrel® 7246. Hitch step 100 is slid into a hitch receiver 1000 and fastened in place with the aid of a hitch pin 1002. The hitch receiver 1000 had been installed on a pickup truck having a weight of about 4000 pounds. The truck was backed into a stationary object (in particular, a vertical cylinder) at about 1-2 mph such that the object impacted the hitch step 100 at the point indicated at the arrow 1004.

In response to this off-axis impact, the hitch step twisted in a horizontal plane, so that the left exterior panel 210 was displaced forward, and the right exterior panel 114 was displaced rearward. The hitch step 100 basically twisted in that portion of the throat region 232 that was disposed rearward of the receiver 1000. Less dramatic and more local compression and distortion of step body members 106, 212, 208, 214, 216 was also seen. After the truck was driven forward after impact, the hitch step returned to its pre-impact location with perfect elastic memory.

Figure 11:
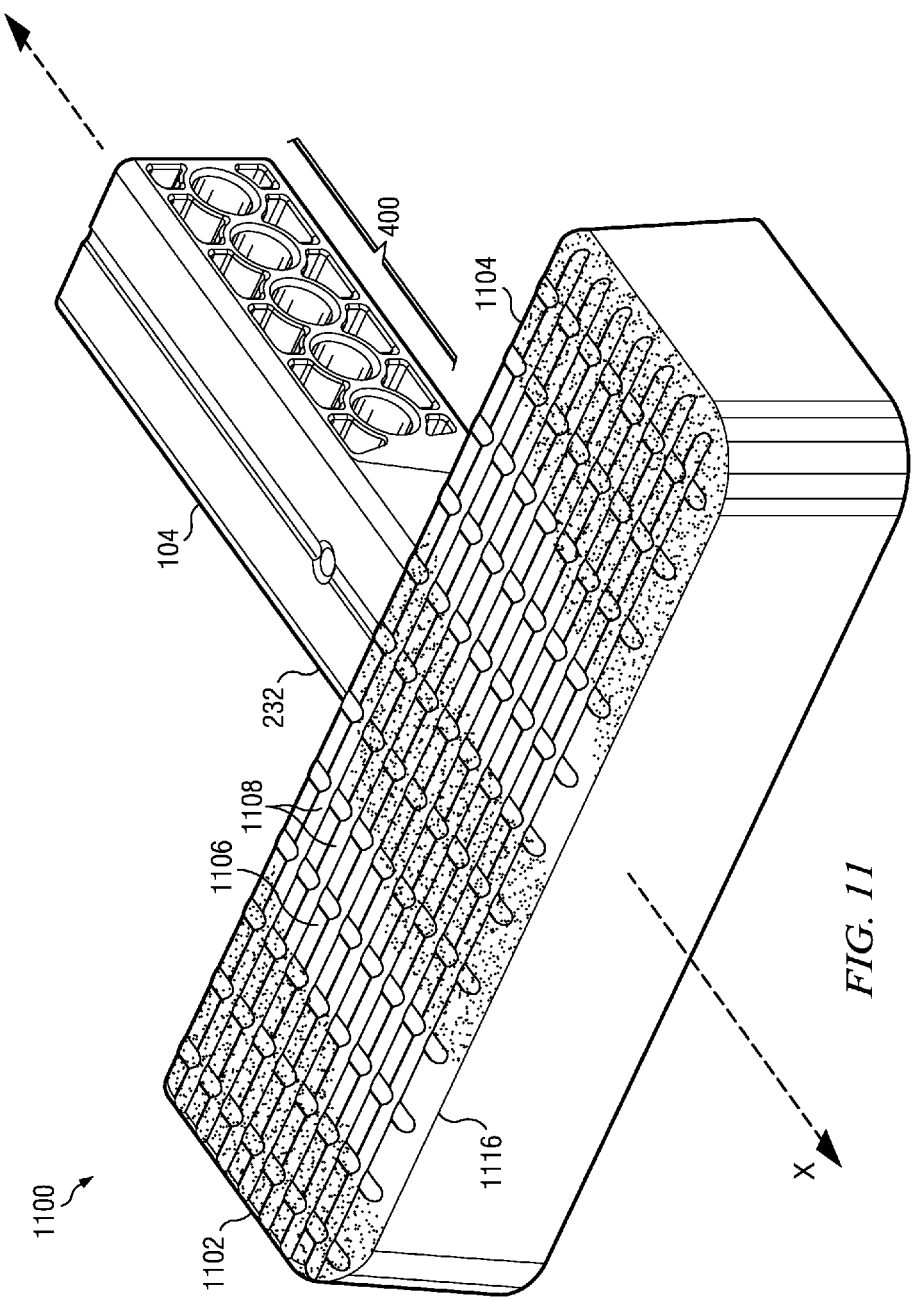
FIG. 11 is an isometric view of a seventh embodiment of the invention, which includes an overmolded friction pad on a top surface of the step body.

FIG. 11 illustrates an embodiment in which a hitch step 1100 is injection-molded in a two-shot process. A hitch step body 1102, throat region 232 and forward tongue region 400 can be injection-molded of a relatively tough and stiff thermoplastic polymer compound, as described previously, and otherwise having the structural characteristics of the embodiment illustrated in FIGS. 1-4. Once completed, a friction pad 1104 can be overmolded onto an upper surface 1116 of the hitch step body 1102. The polymer for the second-shot injection can be chosen to have a more frictional surface than would be obtained from the first-shot polymer; for example, a relatively soft TPE could be selected. A top surface of the friction pad 1104 can have longitudinal and transverse elongate concave treads 1106, 1108, similar in form to treads 128, 130 seen in FIGS. 1-4. Other tread surfaces can be chosen instead as traction and ornamental characteristics dictate, as these are no longer affected by the presence of molded support members underneath them.

Figure 12:
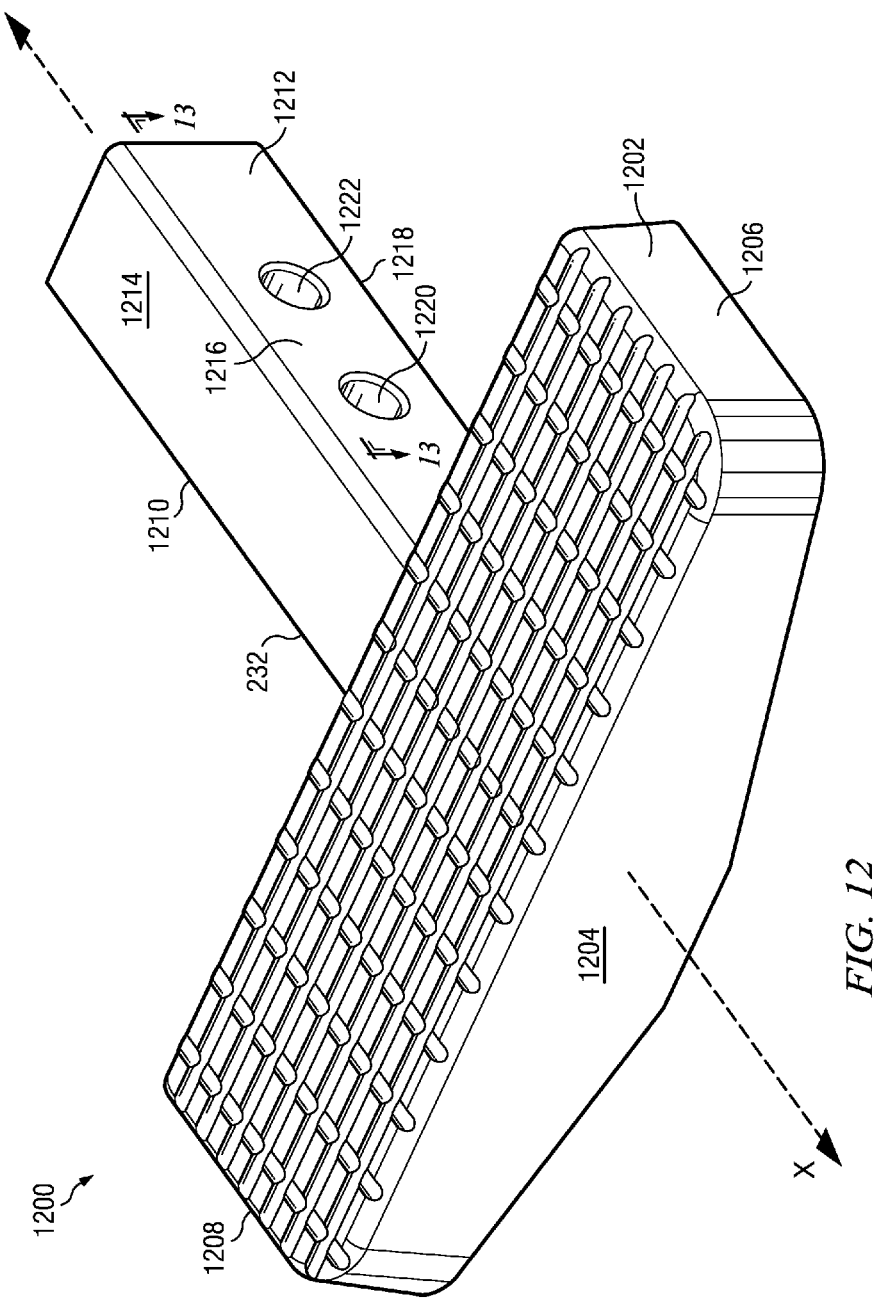
FIG. 12 is an isometric view of an eighth embodiment of the invention, showing varying step body height and an alternative tongue construction.

According to one aspect of the invention, a height of the hitch step body is selected to house internal or external support members that present sufficient y-z cross sectional area (y being transverse and z being vertical) that torsion around axis X can be adequately resisted. FIG. 12 illustrates that this height does not have to be uniform. A hitch step indicated generally at 1200 has a step body 1202 that in general is formed like body 102 of hitch step 100, as seen in FIGS. 1-4. But a rear external side wall 1204 of step body 1202 has a maximum height through a transverse segment near axis X, and then transversely tapers. The tapering can be linear, as shown. A height of a right exterior side panel 1206 and that of a left exterior side panel 1208 can be chosen to be significantly less than the maximum height of rear panel 1204. This is because as the transverse distance from axis X grows, the resistance to torque around axis X provided by any support member located at that transverse distance need not be as great. The height of any and all internal support members (not shown) can be reduced in similar fashion. A height of a forward external panel (not shown) of step body 1202 can generally conform to the shape of the rear panel 1204.

A tongue 1210 can have a throat region 232 similar to that described for hitch step 100 (FIGS. 1-4). A forward region 1212 of the tongue 1210 extends axially forwardly from throat region 232. The forward region 1212 has a top panel 1214 and an exterior right wall 1216 that extends downwardly from top panel 1214 to a bottom panel 1218. Two hitch pin cylinders 1220, 1222 open onto the surface of right wall 1216. Unlike the embodiment shown in FIGS. 1-4, the cylinders 1220, 1222 are spaced apart from each other. It is also possible to have only a single hitch pin location.

Figure 13:
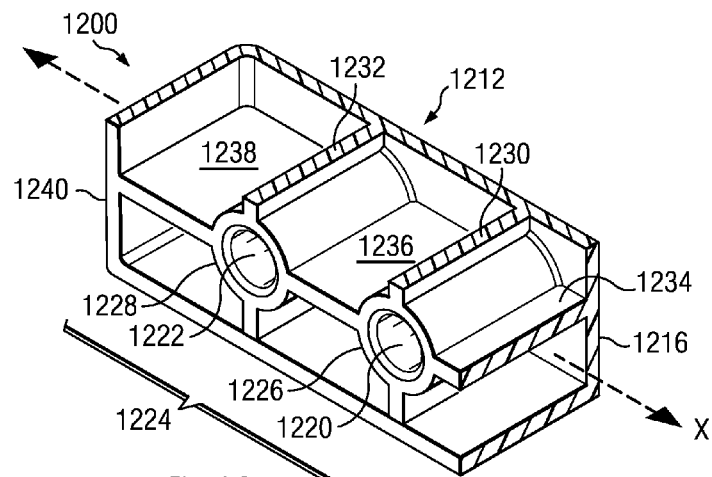
FIG. 13 is a top sectional detail taken substantially along line 13-13 of FIG. 12.

As seen in FIG. 13's top sectional view, the forward region 1212 has no axial vertical longitudinal member; this has been moved rightward to form right side wall 1216. The left side of the forward region 1212 has an open external face 1224 that bounds a volume which extends to the inner surface of right exterior panel 1216. A cylinder sidewall 1226 forms cylinder 1220 and a further cylindrical sidewall 1228 forms cylinder 1222, and these extend from the open face 1224 to the right tongue side wall 1216. A transverse vertical member 1230 upwardly extends from cylindrical sidewall 1226 to top panel 1214 (FIG. 12). A parallel transverse vertical member 1232 upwardly extends from cylindrical sidewall 1228 to top panel 1214. Similar transverse vertical members are positioned below the cylindrical sidewalls 1226, 1228 to extend to bottom panel 1218, as per the embodiment shown in FIGS. 1-4. Horizontal panel 1234 extends rearwardly from cylindrical sidewall 1226. Horizontal panel 1236 spans the axial distance between cylindrical sidewalls 1226 and 1228. Horizontal panel 1238 extends between cylindrical sidewall 1228 and a forward wall 1240. All of the horizontal panels 1234, 1236, 1238 reside in the plane including axis X. All of the walls 1240, 1238, 1228, 1232, 1236, 1230, 1226 and 1234 extend inwardly from the open face 1224 to terminate at wall 1216, and thus forward region 1212 is a single volume which can be formed by a single side action. The walls 1240, 1238, 1228, 1232, 1236, 1230, 1226 and 1234 can all have a slight draft from open face 1224 to closed right wall 1216, so that the cells which they form are larger at open face 1224 than they are at wall 1216.

Figure 14:
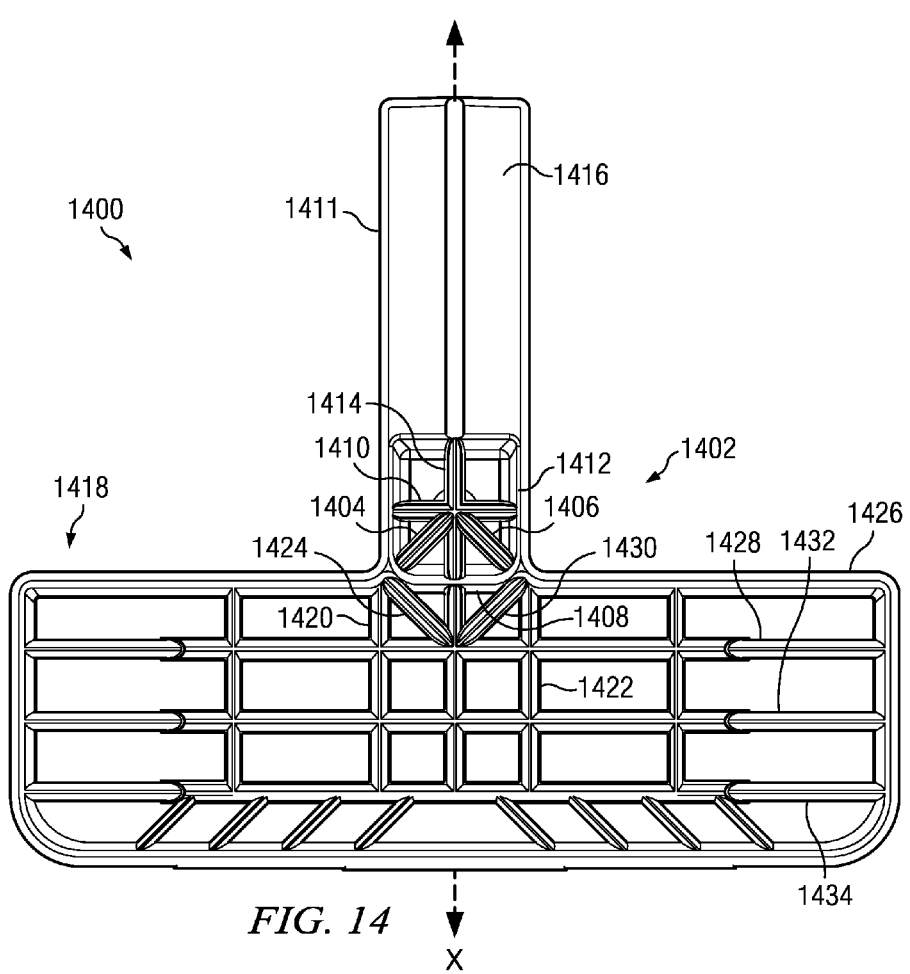
FIG. 14 is bottom view of a ninth embodiment of the invention, showing an alternative reinforcing rib or support member structure.

In the embodiment shown from the bottom in FIG. 14, a hitch step indicated generally at 1400 is molded of a polymer compound as described for FIGS. 1-4 and in general has the same structural characteristics. However, in a throat region 1402, diagonal support members or ribs 1404, 1406 have been added for stiffness. The throat region 1402 is rearwardly bounded by a transverse support member 1408. A second transverse support member 1410 is positioned orthogonally to axis X and in parallel to support member 1408, to span between right external panel 1411 and left external panel 1412. A central longitudinal vertical member 1414 extends along axis X all of the way through a tongue 1416 of the hitch step 1400 and through most of a hitch step body 1418. Diagonal member 1404 extends from a junction of transverse member 1410 and longitudinal member 1414, rearwardly and rightwardly to near a junction of member 1408 and wall 1411. In bilateral symmetry, diagonal member 1406 extends from a junction of transverse member 1410 and longitudinal member 1414, rearwardly and leftwardly to near a junction of member 1408 and external side panel 1412 of tongue 1416.

A third diagonal rib or support member 1424 proceeds from near a junction of right external side panel 1411 and external forward panel 1426 of the step body 1418, rearwardly and leftwardly to near a junction of a transverse support member 1428 of body 1418 and central longitudinal member 1414. A fourth diagonal rib or support member 1430 proceeds from near a junction of left external side panel 1412 and forward external side panel 1426 of the step body 1418, rearwardly and rightwardly to near a junction of transverse support member 1428 and central longitudinal member 1414.

The addition of diagonal members 1404, 1406, 1424, 1430 divide cells which substantially had been parallelogram-based prisms into cells which substantially are triangular prisms. The four sided prisms had a freedom to deform, in which sides in parallel to each other could be deflected to be farther apart or closer to each other, while the three-sided prisms do not possess this freedom of motion.

The thicknesses of selected ones of the internal support members of the step body 1418 have been increased to provide further resistance to torsion around axis X, and further resistance to bending in a vertical plane including axis X. The thickened members include central longitudinal member 1414, a longitudinal member 1420 to the right of it and slightly to the right of external sidewall 1411, and a longitudinal member 1422 to the left of central member 1414 and slightly to the left of left external sidewall 1412. Transverse members 1428, 1432 and 1434 are make thicker not through their entire lengths but only for sections relatively near axis X.

Figure 15:
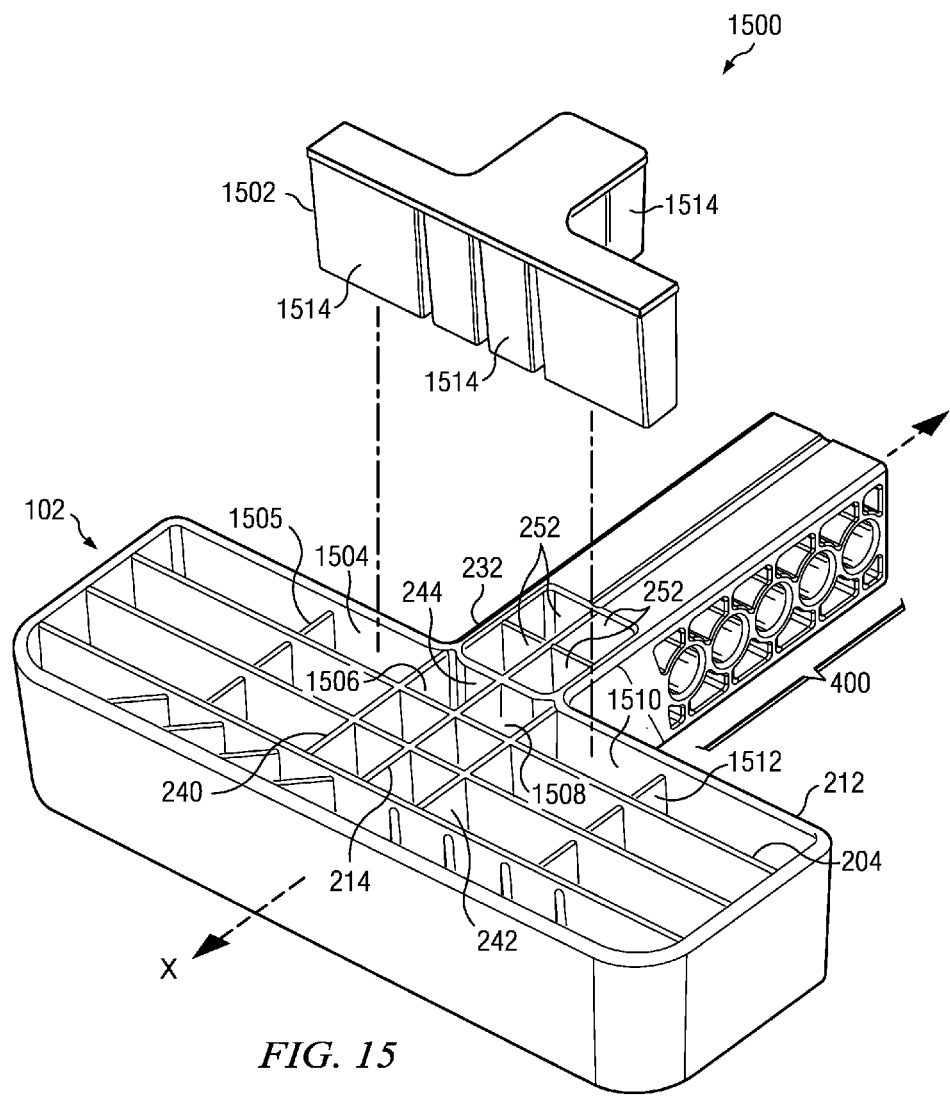
FIG. 15 is an exploded bottom view of a tenth embodiment of the invention, illustrating an injection-molded hitch step and reinforcing insert.

In FIG. 15, a hitch step indicated generally at 1500 includes a hitch step body 102, a throat region 232 and a forward tongue region 400, integrally molded from a polymer compound, and similar in structure to the embodiment shown in FIGS. 1-4. But the hitch step 1500 also includes a separate insert 1502 which is meant to fill selected ones of the cells formed in the throat region 232 and the body 102. These cells include cells 252 of the throat region 232. The filled cells further include cell 1504, bounded by front body panel 212, longitudinal support member 1505, internal transverse member 204 and longitudinal support member 240; cell 1506, bounded by longitudinal support member 240, transverse member 244, central longitudinal member 214, and transverse member 204; cell 1508, bounded by central longitudinal member 214, transverse member 244, transverse member 204 and longitudinal member 242; and cell 1510, bounded by longitudinal member 242, front body panel 212, longitudinal member 1512 and transverse member 204. The insert 1502 has filling portions 1514 that are dimensioned to be closely received into respective ones of the cells 252, 1504, 1506, 1508 and 1510, as by snap-fitting, press-fitting and/or the use of an adhesive. As inserted, the filling portions 1514 will greatly increase the resistance to torque around axis X of the throat region 232 and adjacent region of step body 102. The insert 1502 could also be second-shot injection molded.

Figure 16:
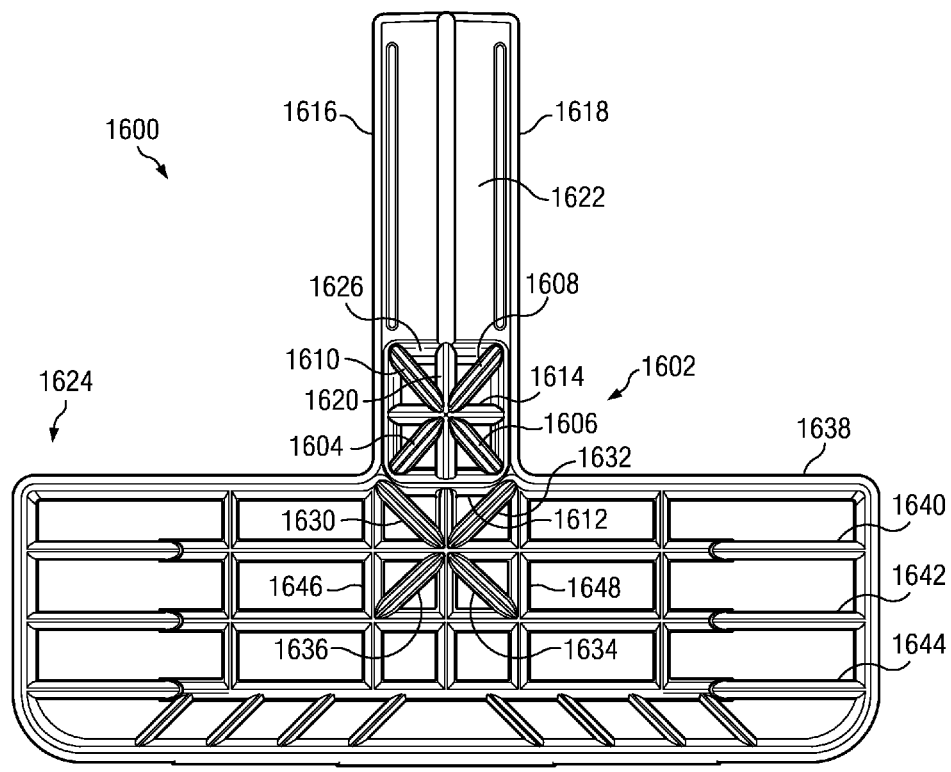
FIG. 16 is a bottom view of an eleventh embodiment of the invention, illustrating additional reinforcing ribs.

In FIG. 16, a hitch step indicated generally at 1600 is molded of a polymer compound as described for FIGS. 1-4 and in general has the same structural characteristics. However, in a throat region 1602, diagonal support members or ribs 1604, 1606, 1608 and 1610 have been added for stiffness. The throat region 1602 is rearwardly bounded by a transverse support member 1612. A second transverse support member 1614 is positioned orthogonally to axis X and in parallel to support member 1612, to span between right external panel 1616 and left external panel 1618. A central longitudinal vertical member 1620 extends along axis X all of the way through a tongue 1622 of the hitch step 1600 and through most of a hitch step body 1624. Diagonal member 1604 extends from a junction of transverse member 1614 and longitudinal member 1620, rearwardly and rightwardly (leftwardly in this bottom view) to near a junction of member 1612 and wall 1616. In bilateral symmetry, diagonal member 1606 extends from a junction of transverse member 1614 and longitudinal member 1620 rearwardly and leftwardly to near a junction of member 1612 and external side panel 1618 of tongue 1622. Diagonal member 1608 extends from a junction of transverse member 1614 and longitudinal member 1620, forwardly and leftwardly to the junction of external side panel 1618 and transverse member 1626. Diagonal member 1610 extends from a junction of transverse member 1614 and longitudinal member 1620, forwardly and rightwardly to the junction of external side panel 1616 and transverse member 1626.

Four additional diagonal ribs or support members 1630, 1632, 1634, and 1636 are rearward of member 1612. Diagonal member 1630 proceeds from near a junction of right external side panel 1616 and external forward panel 1638 of the step body 1624 rearwardly and leftwardly to near a junction of a transverse support member 1640 of body 1624 and central longitudinal member 1620. Diagonal rib or support member 1632 proceeds from near a junction of left external side panel 1618 and forward external side panel 1638 of the step body 1624 rearwardly and rightwardly to near a junction of transverse support member 1640 and central longitudinal member 1620. Diagonal rib or support member 1634 proceeds from near a junction of transverse support member 1640 and longitudinal member 1620 forwardly and leftwardly to near a junction of transverse support member 1642 and longitudinal member 1648. Diagonal rib or support member 1636 proceeds from near a junction of transverse support member 1640 and longitudinal member 1620 rightwardly and forwardly to near a junction of transverse support member 1642 and longitudinal member 1646. The addition of diagonal members 1630, 1632, 1634, and 1636 divide cells which had been parallelogram-based prisms into cells substantially like triangular prisms. The four sided prisms had a freedom to deform, in which sides in parallel to each other could be deflected to be farther apart or closer to each other, while the three-sided prisms do not possess this freedom of motion.

Selected ones of the internal support members of the step body 1624 have been increased in thickness to provide further resistance to torsion around axis X. The thickened members include central longitudinal member 1620, a longitudinal member 1646 to the right of it and slightly to the right of external sidewall 1616 and a longitudinal member 1648 to the left of central member 1620 and slightly to the left of left external sidewall 1618. Transverse members 1640, 1642 and 1644 are make thicker not through their entire lengths but only for sections relatively near axis X. The thickened members can be about 50% or 0.1 inches thicker than the other internal structural members for example, and approach the nominal wall thickness used to design the hitch step.

Figure 17:
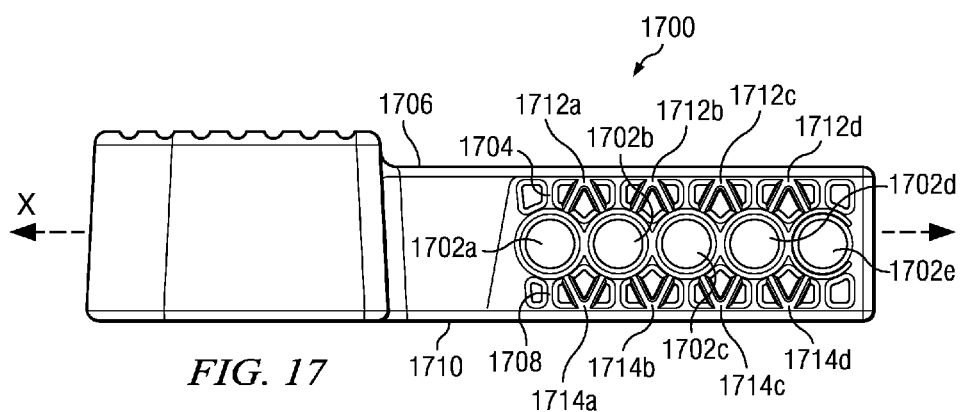
FIG. 17 is a side view of a hitch step with an alternative receiver tongue structure.
Figure 18:
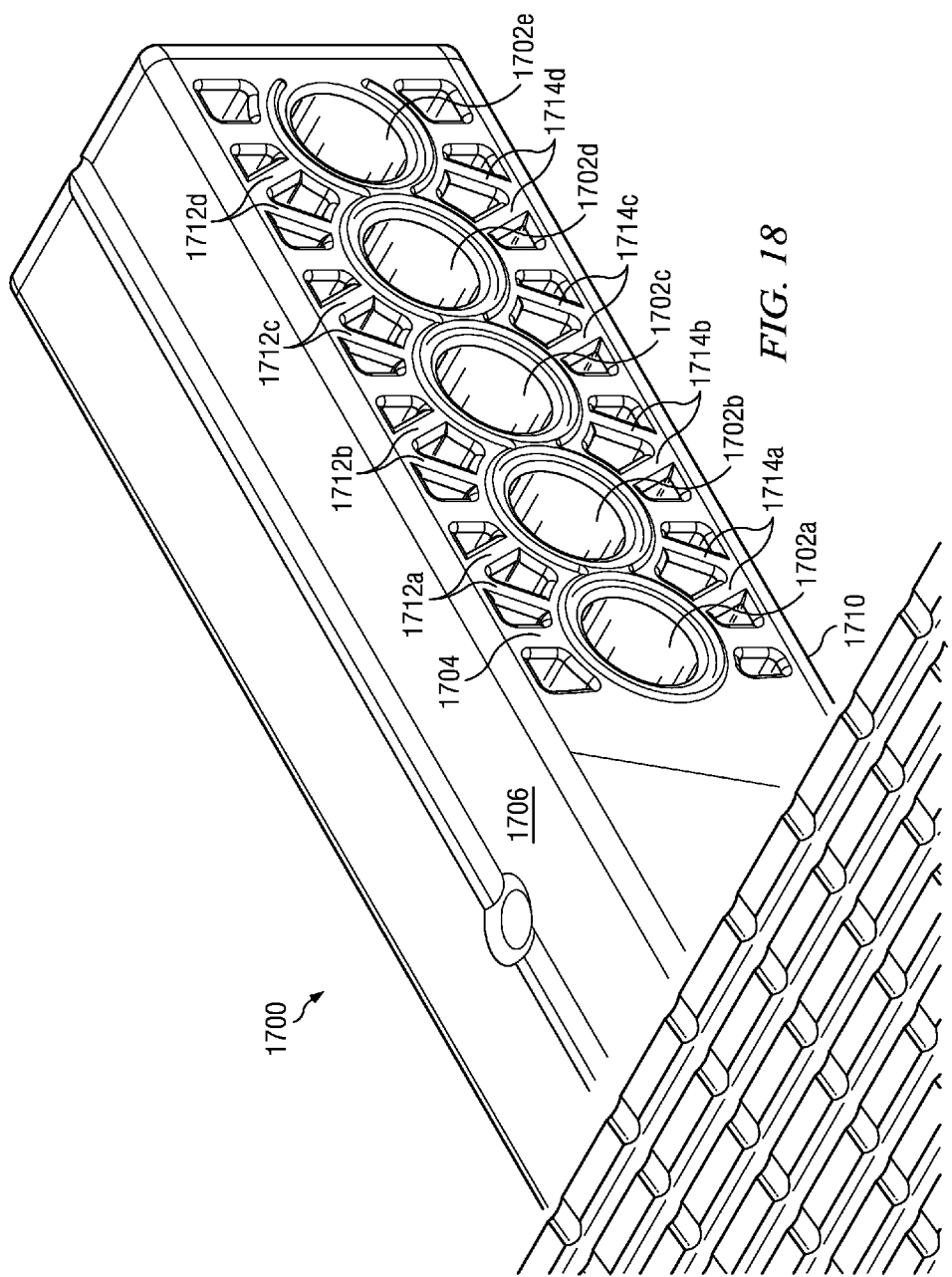
FIG. 18 is an enlarged perspective view of the alternative receiver tongue structure shown in FIG. 17.

In FIGS. 17 and 18 the receiver post body 1700 generally has the same characteristics as the receiver post body 104 shown in FIG. 3. In this embodiment, a plurality of cylinders 1702*a-e* are disposed in the receiver post body or tongue 1700 at an angle to the axis X, such as 90 degrees. Each cylinder 1702*a-e* may have a support structure which includes a top vertical member 1704 in parallel with a center of the cylinder and extending from the cylinder to the top panel 1706. There may also be bottom vertical members 1708 underneath respective ones of the cylinders 1702*a-e*, and in parallel with their respective centers, and each extending from a respective cylinder to the bottom panel 1710. There may also be v-shaped diagonal members 1712*a-d* extending from the adjacent cylinders 1702*a-e* to the top panel. For example, v-shaped member 1712*a* has legs which extend from cylinders 1702*a* and 1702*b* to the top member 1706. Likewise, there may be v-shaped diagonal members 1714*a-d* extending from adjacent cylinders to the bottom panel 1710. For example, legs of v-shaped member 1714*a* extend from respective ones of cylinders 1702*a* and 1702*b* to bottom member 1710. V-shaped members 1712*a-d*, 1714*a-d* may have thicknesses which are many times smaller than their lengths and may be plates or panels as shown. The V-shaped members provide additional resistance to downward deflection when tongue 1700 is only partly inserted into a hitch receiver, as by aligning forwardmost cylinder 1702*e* with the hitch pin hole (not shown) rather than using cylinder 1702*a*.

The hitch step 100 resists torque in a transverse vertical plane when weight is placed on the top surface of the step body 102. For example, for the embodiment shown in FIG. 16, as fabricated from DuPont Hytrel® 7246 to a nominal wall thickness of 0.2 inches, if at room temperature a 250 pound person steps on a portion of the top surface of step body 102 at a distance from axis X of approximately four inches, the top surface of the step body 102 should deflect in a transverse vertical plane (that is, one orthogonal to axis X) by no more than about ten degrees from the horizontal plane that the top surface occupies at rest or in an unloaded condition. Preferably, a 200 pound person stepping on this location, at room temperature, will cause a deflection in the transverse vertical plane of no more than about six degrees, and a 300 pound person stepping on this location, at room temperature, will cause a deflection in the transverse vertical plane of no more than about eight degrees. The placement, thickness and composition of the hitch step 100's reinforcing members are provided to minimize the amount of vertical deflection when step 100 is being used as a step, while at the same time permitting a degree of elastic horizontal compression when it is acting as a bumper.

In summary, several embodiments of a hitch step have been described, all of which can be molded from a polymer compound. The hitch steps are substantially hollow, having plural open exterior faces to permit their fabrication by molding, and are constituted by walls and reinforcing plates which are many times thinner than the overall dimensions of the hitch steps. The hitch steps are capable of supporting the weight of a typical user, while also absorbing energy from rear impact. While illustrated embodiments of the present invention have been described and illustrated in the appended drawings, the present invention is not limited thereto but only by the scope and spirit of the appended claims.

We claim:

1. A hitch step adapted for insertion into a hollow vehicle hitch receiver along a longitudinal axis, the hitch step comprising:

a tongue having a rear end, the tongue having a vertical height and a width transverse to the axis, the height and width of the tongue being sized such that the tongue may be closely slidably received into the vehicle hitch receiver;

a throat region of the tongue formed to adjoin the step body, a forward region of the tongue extending forwardly from the throat region, at least one hitch pin hole formed in the forward region to extend transversely therethrough;

the throat region having at least one open external face parallel to the axis, a throat region volume extending vertically from the open face and extending to either an opposed face of the throat region or to a panel, a plurality of vertically disposed reinforcing plates of the throat region extending vertically from the open face and dividing all of the throat region volume into substantially triangularly prismatic cells; and a step body joined to the rear end of the tongue and in use solely supported in cantilever fashion by the tongue, the step body having a rear face, a front face, a left end and a right end, a top surface of the step body extending from the front face to the rear face and from the left end to the right end, the top surface having a width transverse to the axis which is many times the width of the tongue, the top surface adapted to receive a foot of a user at least at a predetermined location displaced from the axis in a width direction, the reinforcing plates of the throat region being so disposed to resist torque around the axis caused by the weight of the user imposed on said location, the tongue and the step body being integrally molded of a polymer compound.

2. The hitch step of claim 1, wherein the plates include a vertical member aligned with the axis.

3. The hitch step of claim 1, wherein the plates include a plate oriented transversely to the axis.

4. The hitch step of claim 1, wherein the rear end of the tongue is joined to the front face of the step body throughout the width and height of the tongue.

5. The hitch step of claim 1, wherein when the tongue of the hitch step is inserted into a hitch receiver and a 250 pound load is placed on a top surface of the step body at a location transversely displaced from the axis by 4 inches, the step body will deflect in a transverse vertical plane by no more than ten degrees.

6. The hitch step of claim 5, wherein when the tongue of the hitch step is inserted into a hitch receiver and a 265 pound load is placed on a top surface of the step body at a location transversely displaced from the axis by 4 inches, the step body will deflect in a transverse vertical plane by no more than eight degrees.

7. A hitch step for insertion into a hollow vehicle hitch receiver, the hitch step comprising:
   a substantially hollow step body having a height, a width transverse to an axis of the vehicle hitch receiver and a depth in parallel to the axis, at least one transverse support member inside the step body having a thickness that is many times less that the depth of the step body, the transverse member transversely extending for at least a substantial portion of the step body and extending in a vertical direction for at least a substantial portion of the height of the step body, at least one external face of the step body in parallel to the axis being open;
   a substantially hollow tongue having a rear end joined to the step body and a front end axially displaced from the rear end, the tongue sized to be slidably received into the vehicle hitch receiver and in use providing the sole support for the step body, the tongue having a height and a width transverse to the axis, the width of the tongue being many times less than the width of the step body;
   a throat region of the tongue adjoining the step body and extending forwardly from the step body along the axis, at least one external face of the throat region being in parallel to the axis and being open, a plurality of vertically disposed reinforcing plates of the throat region extending from the open face to either a horizontal panel or to an opposed external face of the throat region; and
   a forward region of the tongue extending forwardly from the throat region of the tongue, the forward region having at least one external face parallel to the axis which is open and a vertical plate disposed in parallel to the axis, the vertical plate having a thickness in a transverse direction that is many times less than the width of the tongue, a height of the vertical plate extending for at least a substantial portion of the height of the tongue, at least one trailer hitch pin hole formed to transversely extend through the vertical plate;
   wherein the step body and the tongue are integrally molded of a polymeric material.

8. The hitch step of claim 7, wherein the step body has a plurality of transverse members including said at least one transverse member, the transverse members being axially spaced apart from each other by a distance at least as great as the thickness of the transverse members.

9. The hitch step of claim 7, wherein the step body has a top panel joined to said at least one transverse member and extending substantially for the entire width and depth of the step body, a thickness of the top panel in the vertical direction being many times less than the height of the step body.

10. The hitch step of claim 7, wherein the vertical plate of the forward region of the tongue is positioned on the axis and axially rearwardly extends through the throat region and into the step body for a substantial portion of the depth of the step body.

11. The hitch step of claim 7, wherein said at least one transverse support member of the step body is one of a plurality of internal support members.

12. The hitch step of claim 11, wherein ones of the internal support members intersect each other and divide the volume of the step body into a plurality of cells.

13. The hitch step of claim 12, wherein the cells are substantially prismatic.

14. The hitch step of claim 7, wherein the polymer compound exhibits a flexural modulus, as tested according to ISO 178, of at least 550 MPa at 23 C.

* * * * *